United States Patent [19]

Koegel et al.

[11] 4,308,615
[45] Dec. 29, 1981

[54] MICROPROCESSOR BASED MAINTENANCE SYSTEM

[75] Inventors: Robert J. Koegel, Glendale; Ronald E. Lange; Terry L. Davis, both of Phoenix, all of Ariz.

[73] Assignee: Honeywell Information Systems Inc., Phoenix, Ariz.

[21] Appl. No.: 75,773

[22] Filed: Sep. 17, 1979

[51] Int. Cl.³ .......................................... G01R 31/28
[52] U.S. Cl. .................................. 371/20; 324/73 R; 364/900; 371/16
[58] Field of Search .......................... 371/20, 16, 25; 324/73 R, 73 AT; 364/200, 900

[56] References Cited

U.S. PATENT DOCUMENTS

| | | | |
|---|---|---|---|
| 3,599,161 | 8/1971 | Stoughton et al. | 371/20 |
| 3,631,229 | 12/1971 | Bens et al. | 371/20 |
| 3,958,111 | 5/1976 | Hackett | 371/25 |
| 4,125,763 | 11/1978 | Drabing et al. | 371/25 |
| 4,174,805 | 11/1979 | Fulks et al. | 371/20 |
| 4,192,451 | 3/1980 | Swerling et al. | 371/20 |
| 4,194,113 | 3/1980 | Fulks et al. | 371/20 |

*Primary Examiner*—Charles E. Atkinson
*Attorney, Agent, or Firm*—W. W. Holloway, Jr.; L. J. Marhoefer; N. Prasinos

[57] ABSTRACT

There is disclosed herein an apparatus for use in automated testing of elements in data processing systems such as the central processing unit. The system is comprised of a microprocessor with associated firmware, RAM and peripheral communications devices. There are two communication interface ports for receiving commands and instructions from local and remote computer terminals or from data processing units programmed to cause the testing apparatus to perform predetermined sequences of tests. There is also a port for connection to a portable maintenance panel which can be held in the hand of a field engineer for controlling the testing apparatus. The system is designed to replace prior art maintenance panels used for debugging computer hardware.

12 Claims, 27 Drawing Figures

| FUNCTION | RD/WR | I/O ADDR. | DATA 7 | DATA 6 | DATA 5 | DATA 4 | DATA 3 | DATA 2 | DATA 1 | DATA 0 |
|---|---|---|---|---|---|---|---|---|---|---|
| DATA TO CPU, ZMPD 30-35 | WR | 80 | | 30 | 31 | 32 | | 33 | 34 | 35 |
| 24-29 | WR | 81 | | 24 | 25 | 26 | | 27 | 28 | 29 |
| 18-23 | WR | 82 | | 18 | 19 | 20 | | 21 | 22 | 23 |
| 12-17 | WR | 83 | | 12 | 13 | 14 | | 15 | 16 | 17 |
| 06-11 | WR | 84 | | 06 | 07 | 08 | | 09 | 10 | 11 |
| DATA TO CPU, ZMPD 00-05 | WR | 85 | | 00 | 01 | 02 | | 03 | 04 | 05 |
| ADDRESS TO CPU, MPA 28-33 | WR | 90 | | 28 | 29 | 30 | | 31 | 32 | 33 |
| 22-27 | WR | 91 | | 22 | 23 | 24 | | 25 | 26 | 27 |
| 16-21 | WR | 92 | | 16 | 17 | 18 | | 19 | 20 | 21 |
| 10-15 | WR | 93 | | 10 | 11 | 12 | | 13 | 14 | 15 |
| 04-09 | WR | 94 | | 04 | 05 | 06 | | 07 | 08 | 09 |
| ADDRESS TO CPU, MPA 00-03 | WR | 95 | | | | 00 | | 01 | 02 | 03 |
| CPU STOP ON FAULT, FLTSTOP 18-23 | WR | 98 | SSSF | IPR | DLF | SLCI | | SLC2 | UWS | MSEG |
| 12-17 | WR | 99 | | STR | MME | DRL | | FTG | MPGE | OVFL |
| 06-11 | WR | 9A | | INH STOP | CNF | TRO | | SHF | DVCK | CMD |
| CPU STOP ON FAULT, FLTSTOP 00-05 | WR | 9B | | SUF | ONC | | | LUF | PAR | CMD |
| CPU DISPLAY CONTROL, DCL 32-39 | WR | A0 | 32 | 33 | 34 | 35 | 36 | 37 | 38 | 39 |
| 24-31 | WR | A1 | 24 | 25 | 26 | 27 | 28 | 29 | 30 | 31 |
| 16-23 | WR | A2 | 16 | 17 | 18 | 19 | 20 | 21 | 22 | 23 |
| 08-15 | WR | A3 | 08 | 09 | 10 | 11 | 12 | 13 | 14 | 15 |
| CPU DISPLAY CONTROL, DCL 00-07 | WR | A4 | 00 | 01 | 02 | 03 | 04 | 05 | 06 | 07 |
| CPU ENABLE CONTROL, 8-15 | WR | A5 | WR/RD | STORE ENA | CACHE ENA | C PT ENA | VU ENA | CU ENA | DU ENA | DIS ENA |
| CPU ENABLE CONTROL, 0-7 | WR | A6 | | | INH MEM OVLP | INH CU OVLP | | | CACHE 2 ENA | CACHE 1 ENA |
| CPU FLAG CONTROL, 30-35 | WR | A8 | | SOA INDR | SOA SEGID | SOA VA | | SOA VA SEGID | SOA VA&WS | SOA WS |
| CPU FLAG CONTROL, 24-29 | WR | A9 | | | | SOA STORES | | SOA ALL | SOA INSTR | SOA OPND |

FIG. 3A    TO FIG. 3B

FIG. 3B — FROM FIG. 3A

| Description | Bits | R/W | Addr | STEP / OU SLOW / SCOPE RPT | MEM STEP / OU FAST / XEC SW | OU STEP / DU SLOW | VU STEP | CU STEP / DU FAST | DU STEP / VU SLOW / INIT CLR | VU STEP / VU FAST / CU FAST / INIT CTL |
|---|---|---|---|---|---|---|---|---|---|---|
| CPU FLAG CONTROL, 18-23 | | WR | AA | ///// | ///// | ///// | ///// | ///// | ///// | ///// |
| ↕ 12-17 | | WR | AB | ///// | ///// | ///// | ///// | ///// | ///// | ///// |
| ↕ 06-11 | | WR | AC | ///// | ///// | ///// | ///// | ///// | ///// | ///// |
| CPU FLAG CONTROL 00-5 | | WR | AD | SCOPE RPT | XEC SW | XEC | ///// | ///// | ///// | ///// |
| DATA FROM CPU, ZMPD 30-35 | | RD | 80 | 30 | 31 | 32 | ///// | 33 | 34 | 35 |
| ↕ 24-29 | | RD | 81 | 24 | 25 | 26 | ///// | 27 | 28 | 29 |
| ↕ 18-23 | | RD | 82 | 18 | 19 | 20 | ///// | 21 | 22 | 23 |
| ↕ 12-17 | | RD | 83 | 12 | 13 | 14 | ///// | 15 | 16 | 17 |
| ↕ 06-11 | | RD | 84 | 06 | 07 | 08 | ///// | 09 | 10 | 11 |
| DATA FROM CPU, ZMPD 00-05 | | RD | 85 | 00 | 01 | 02 | ///// | 03 | 04 | 05 |
| CPU FLAG STATUS, 0-7 | | RD | A0 | DIS | SOF | ADR STOP | VU STEP | CU STEP | DU STEP | OU STEP |
| CPU CONTROL POINT BUS 0-7 | | RD | B0 | AR/BUSY | ///// | ///// | ///// | ///// | ///// | ///// |
| CPU DISPLAY BUS BCP-DSP 66-71 | | RD | D0 | 66 | 67 | 68 | ///// | 69 | 70 | 71 |
| ↕ 60-65 | | RD | D1 | 60 | 61 | 62 | ///// | 63 | 64 | 65 |
| ↕ 54-59 | | RD | D2 | 54 | 55 | 56 | ///// | 57 | 58 | 59 |
| ↕ 48-53 | | RD | D3 | 48 | 49 | 50 | ///// | 51 | 52 | 53 |
| ↕ 42-47 | | RD | D4 | 42 | 43 | 44 | ///// | 45 | 46 | 47 |
| ↕ 36-41 | | RD | D5 | 36 | 37 | 38 | ///// | 39 | 40 | 41 |
| ↕ 30-35 | | RD | D8 | 30 | 31 | 32 | ///// | 33 | 34 | 35 |
| ↕ 24-29 | | RD | D9 | 24 | 25 | 26 | ///// | 27 | 28 | 29 |
| ↕ 18-23 | | RD | DA | 18 | 19 | 20 | ///// | 21 | 22 | 23 |
| ↕ 12-17 | | RD | DB | 12 | 13 | 14 | ///// | 15 | 16 | 17 |
| ↕ 06-11 | | RD | DC | 06 | 07 | 08 | ///// | 09 | 10 | 11 |
| CPU DISPLAY BUS BCP-DSP 00-05 | | RD | DD | 00 | 01 | 02 | ///// | 03 | 04 | 05 |
| CPU CONTROL POINT BUS, 0-7 | | WR | B0 | 1 | 2 | 3 | 4 | 5 | 6 | 7 |
| CPU CONTROL/STATUS, 0-7 | | WR | C0 | 0 | | | | FORCE STEP | CP BUS WRAP | μP READY |

| FUNCTION | RD/WR | I/O ADDRESS | DATA 7 | DATA 6 | DATA 5 | DATA 4 | DATA 3 | DATA 2 | DATA 1 | DATA 0 |
|---|---|---|---|---|---|---|---|---|---|---|
| MP DATA DISPLAY 0/1 | WR | 00H | | DISPLAY 1 | DISPLAY 1 | DISPLAY 1 | | DISPLAY 0 | DISPLAY 0 | DISPLAY 0 |
| 2/3 | ↕ | 01H | | DISPLAY 3 | DISPLAY 3 | DISPLAY 3 | | DISPLAY 2 | DISPLAY 2 | DISPLAY 2 |
| 4/5 | | 02H | | DISPLAY 5 | DISPLAY 5 | DISPLAY 5 | | DISPLAY 4 | DISPLAY 4 | DISPLAY 4 |
| 6/7 | | 03H | | DISPLAY 7 | DISPLAY 7 | DISPLAY 7 | | DISPLAY 6 | DISPLAY 6 | DISPLAY 6 |
| 8/9 | | 04H | | DISPLAY 9 | DISPLAY 9 | DISPLAY 9 | | DISPLAY 8 | DISPLAY 8 | DISPLAY 8 |
| MP DATA DISPLAY 10/11 | | 05H | | DISPLAY 11 | DISPLAY 11 | DISPLAY 11 | | DISPLAY 10 | DISPLAY 10 | DISPLAY 10 |
| MP DATA DISPLAY BLANKING | | 06H | D7 | D6 | D5 | D4 | D3 | D2 | D1 | D0 |
| MP DATA/REG DISP BLANKING | | 07H | | R2 | R1 | R0 | D11 | D10 | D9 | D8 |
| MP ADDRESS DISPLAY 0/1 | | 08H | | DISPLAY 1 | DISPLAY 1 | DISPLAY 1 | | DISPLAY 0 | DISPLAY 0 | DISPLAY 0 |
| 2/3 | ↕ | 09H | | DISPLAY 3 | DISPLAY 3 | DISPLAY 3 | | DISPLAY 2 | DISPLAY 2 | DISPLAY 2 |
| 4/5 | | 0AH | | DISPLAY 5 | DISPLAY 5 | DISPLAY 5 | | DISPLAY 4 | DISPLAY 4 | DISPLAY 4 |
| MP ADDRESS DISPLAY 6/7 | | 0BH | | DISPLAY 7 | DISPLAY 7 | DISPLAY 7 | | DISPLAY 6 | DISPLAY 6 | DISPLAY 6 |
| MP COMMAND DISPLAY 0/1 | | 0CH | | | DISPLAY 1 | | | | DISPLAY 0 | |
| MP COMMAND DISPLAY 2 | | 0DH | | | | | | | DISPLAY 2 | |
| MP INDICATORS | ↕ | 0EH | CMD | DATA | ADDR | COMP | STEP DIS | UP | REM ENA | LOC ENA |
| MP ADDR DISPLAY BLANKING | WR | 0FH | A7 | A6 | A5 | A4 | A3 | A2 | A1 | A0 |
| MP KEY DATA | RD | 00H | | | | SEE TABLE BELOW | | | | |
| MP STATUS | RD | 01H | | | | | | | | MP PRESS |

FIG-3C

| COMMAND CODE | FUNCTION | DISPLAY | | ENTRY | | ACTIVE KEYS | | |
|---|---|---|---|---|---|---|---|---|
| | | DATA | ADDR | DATA | ADDR | UPPER / LOWER | ADV / BACK UP | STEP |
| 001 | SCROLL POSITION 1 | X | | | | X | | |
| 002 | ↑         ↑      2 | X | | | | X | | |
| 003 | 3 | X | | | | X | | |
| 004 | 4 | X | | | | X | | |
| 005 | 5 | X | | | | X | | |
| 006 | 6 | X | | | | X | | |
| 007 | 7 | X | | | | X | | |
| 008 | 8 | X | | | | X | | |
| 009 | 9 | X | | | | X | | |
| 00A | 10 | X | | | | X | | |
| 00B | 11 | X | | | | X | | |
| 00C | 12 | X | | | | X | | |
| 00D | ↓         ↓     13 | X | | | | X | | |
| 00E | SCROLL POSITION 14 | X | | | | X | | |
| 200 | ADDRESS REG 0 | X | | | | | | |
| 201 | ↑         ↑      1 | X | | | | | | |
| 202 | 2 | X | | | | | | |
| 203 | 3 | X | | | | | | |
| 204 | 4 | X | | | | | | |
| 205 | 5 | X | | | | | | |
| 206 | ↓         ↓      6 | X | | | | | | |
| 207 | ADDRESS REG 7 | X | | | | | | |
| 208 | BASE ADDRESS REG | X | | | | | | |
| 209 | MASTER BASE A | X | | | | | | |
| 20A | MASTER BASE B | X | | | | | | |
| 20B | EXTENDED BASE REG | X | | | | | | |
| 20C | POINTER REG 1 | X | | | | | | |
| 20D | POINTER REG 2 | X | | | | | | |
| 20E | POINTER REG 3 | X | | | | | | |
| 20F | INSTRUCTION ADDER | X | | | | | | |
| 210 | TIMER | X | | | | | | |
| 211 | LEVEL COUNTER | X | | | | | | |
| 212 | MODE REG | X | | | | X | | |
| 213 | FAULT REG | X | | | | | | |
| 214 | REAL MEMORY ADDRESS | X | | | | | | |
| 215 | LENGTH REG 1 | X | | | | | | |
| 216 | LENGTH REG 2 | X | | | | | | |
| 217 | LENGTH REG 3 | X | | | | | | |
| 218 | INITIAL LENGTH REG | X | | | | | | |
| 219 | INSTRUCT BUFF AND REG 1 | X | | | | | | |
| 21A | INSTRUCT BUFF AND REG 2 | X | | | | | | |

FROM FIG. 3D

| | | | | | | | |
|---|---|---|---|---|---|---|---|
| 21B | INSTRUCT COUNT & IND | X | | | | | |
| 21C | TALLY REG | X | | | | | |
| 21D | DISCRIPTOR REG | X | | | | | |
| 21E | FINAL EFFECTIVE ADDR | X | | | X | | |
| 21F | TRACKER IN USE | X | | | | | |
| 220 | TRACKER A | X | | | | | |
| 221 | TRACKER B | X | | | | | |
| 222 | TRACKER C | X | | | | | |
| 223 | TRACKER D | X | | | | | |
| 224 | INSTRUCTION BUFFER 0 | X | | | X | | |
| 225 | INSTRUCTION BUFFER 1 | X | | | X | | |
| 226 | INSTRUCTION BUFFER 2 | X | | | X | | |
| 227 | INSTRUCTION BUFFER 3 | X | | | X | | |
| 228 | MEMORY PORT A | X | | | X | | |
| 229 | MEMORY PORT B | X | | . | X | | |
| 22A | MEMORY PORT C | X | | | X | | |
| 22B | MEMORY PORT D | X | | | X | | |
| 22C | DATA OUT | X | | | X | | |
| 22D | EIS DATA REGISTER | X | | | X | | |
| 22E | EXPONENT REG | X | | | | | |
| 22F | FINAL EFFECTIVE ADDR | X | | | | | |
| | | | | | | | |
| 300 | A/Q REGISTER | X | | | X | | |
| 301 | INDEX REG 0-3 | X | | | X | | |
| 302 | INDEX REG 4-7 | X | | | X | | |
| 303 | ADDER OUTPUT | X | | | X | | |
| 304 | FLOATING POINT WORD | X | | | X | | |
| 305 | ADDER INPUT HOLD REG (RH) | X | | | X | | |
| 306 | ADDER INPUT HOLD REG (RH) | X | | | X | | |
| 307 | MEMORY HOLDING REG | X | | | X | | |

*FIG-3E*

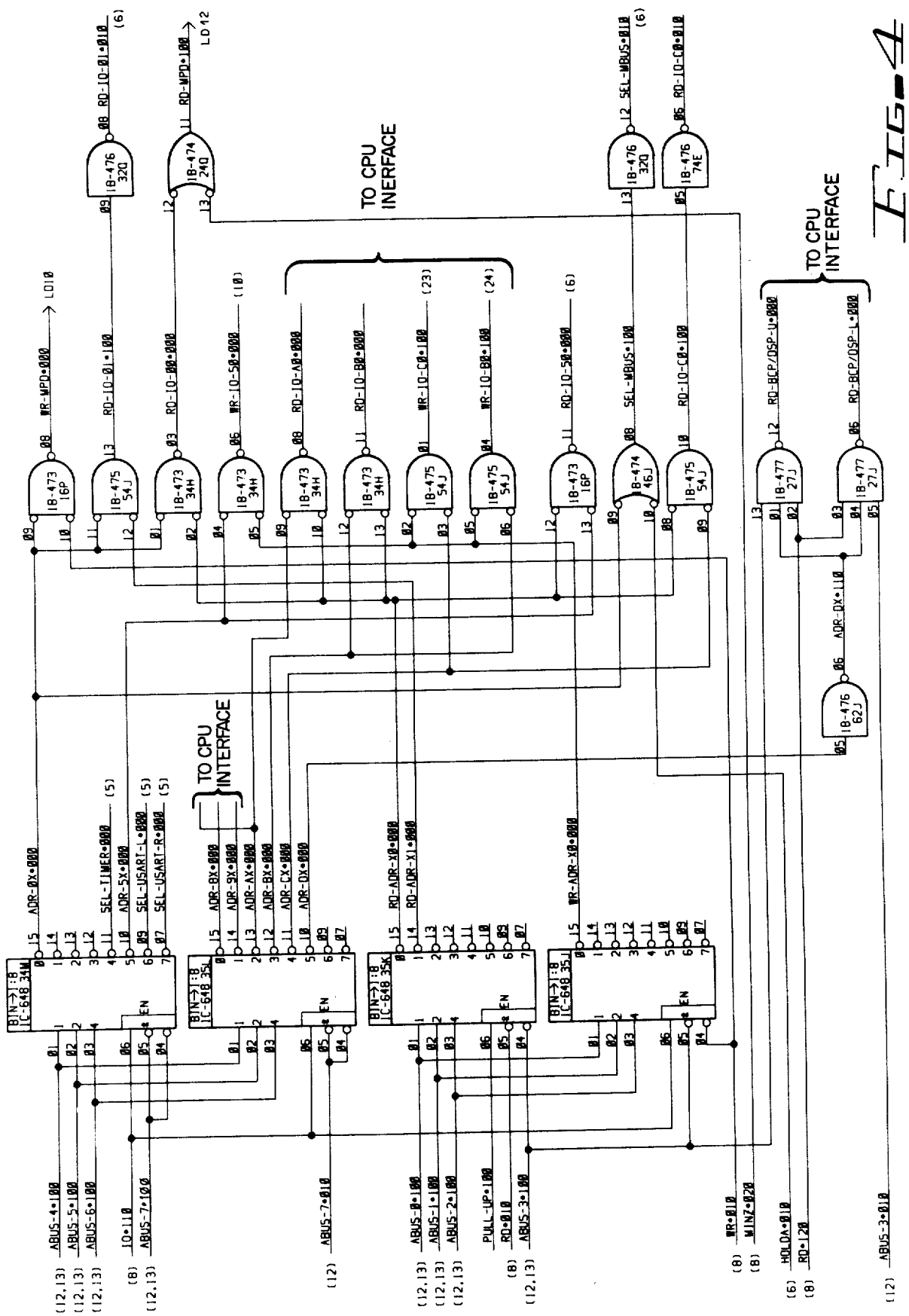

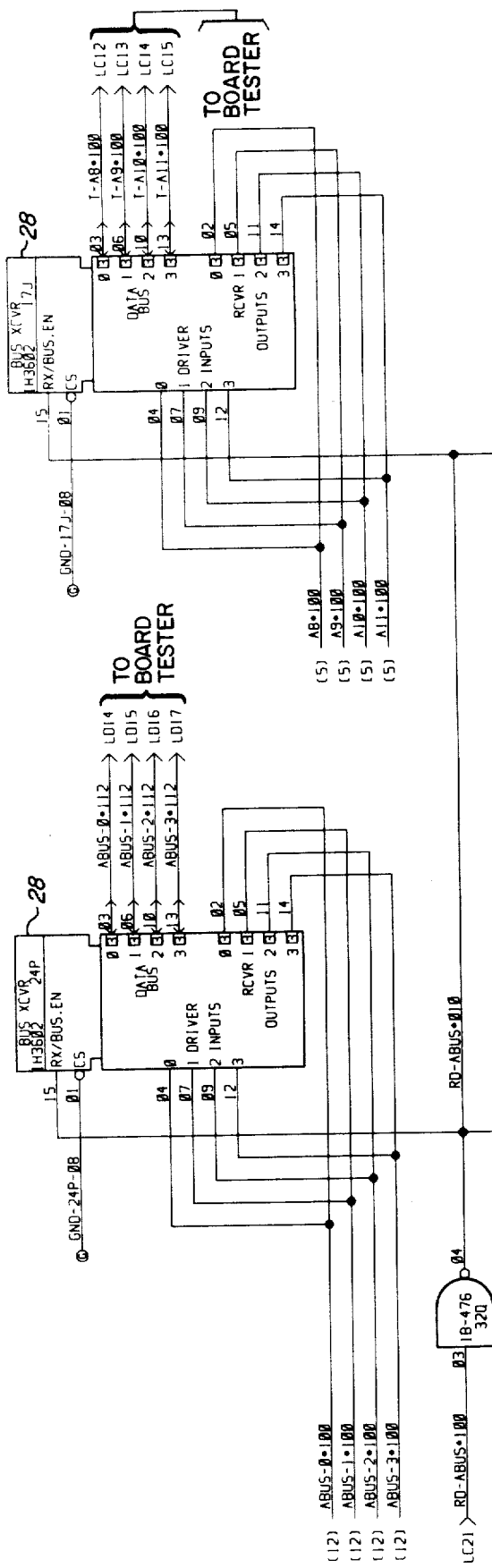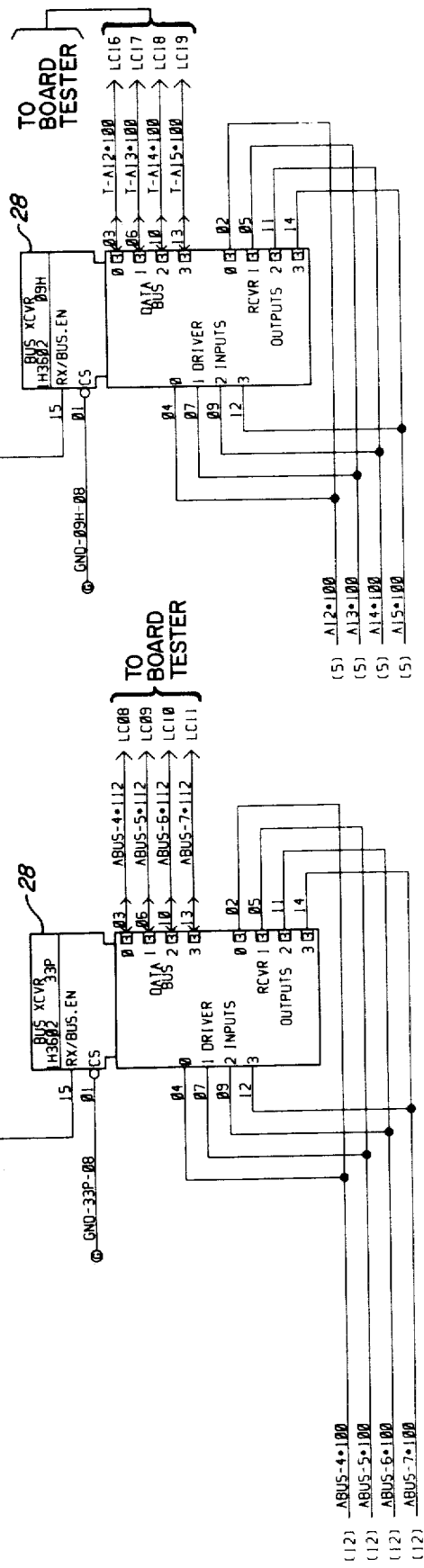
FIG. 13

MICROPROCESSOR BASED MAINTENANCE SYSTEM

BACKGROUND OF THE INVENTION

Most of today's large computer systems need provisions for rapid, low cost trouble shooting of hardware failures in the system. Some have complex arrangements of switches and display apparatus connected with the logic of the unit itself for switching in data, addresses and commands and displaying internal conditions in the machine. Typically these maintenance panel arrangements allow a field engineer to read data from and write data to registers and memory locations, to supply addresses, set fault conditions, set flags, control display functions, check the condition of various control points, check the status of the system and, in general, trace functioning of the system through each step of each machine instruction. Prior art maintenance panels sometimes consisted of long strings of toggle switches for entering data and addresses, and long strings of LED indicators for display of data. Separate command switches were generally required to select timing margins, select the registers or control points to be displayed and to cause the processor to execute commands set into the data switches or enter a single step mode. Entering data, commands and addresses via the prior art maintenance panels, and displaying data relating to the performance of the machine using these prior maintenance panels was time consuming and cumbersome.

Servicing computer systems is now the fastest growing segment of the computer industry according to a recent article in Business Week. A major reason is the spread of distributed processing which is resulting in computer hardware located everywhere. With computer terminals spread throughout a company, very often the data processing system is the central nervous system of the organization. Computer users are now very often less concerned with price performance ratios than with service turnaround time.

The testing apparatus disclosed herein, is designed to replace prior art maintenance panels with microprocessor technology to streamline field engineering and reduce the manufacturing cost of data processing units in which the testing apparatus is incorporated. The system disclosed is incorporated into the structure of the central processing unit or other unit in the data processing system, and has an external interface for control of the testing apparatus from the external world. The preferred embodiment can be controlled from either a portable maintenance panel held in the hand of a field engineer or from a computer terminal located in the vicinity of the tested unit or from a computer terminal located anywhere in the world and coupled to the testing apparatus via a communications network. The possibility exists for interface of the testing apparatus to another digital computer programmed to run a predetermined series of tests on the tested unit from a centrally located field engineering office for rapid and accurate pinpointing of defects in the tested unit. The disclosed testing apparatus thereby enables the mainframe computer manufacturer to maintain a staff of highly trained maintenance specialists in a central location close to the manufacturing plant with the capability of servicing computer systems all over the world. This enhanced maintenance capability both decreases field engineering costs enabling lower hardware costs to the customers, and provides better maintenance support to those customers.

SUMMARY OF THE INVENTION

The invention is a programmable maintenance and testing apparatus used for performing tests on the central processing unit (CPU) or some other unit of a data processing system. By changing the program and designing a specially adapted interface, any CPU or, for that matter, any unit in a data processing system could be tested using this system. The tests to be performed or the events to be caused in the tested unit are under the control of an operator or another digital computer. Such a computer would be programmed to cause the testing apparatus to perform a sequence of predetermined input/output operations to the unit under test for causing the desired events in the tested unit and for receiving data indicative of the performance of the unit under test. The testing apparatus allows individual registers in the CPU and individual memory locations to be read from and written to, and allows an operator to examine control points in the tested unit indicating the correctness of performance of the tested unit. The testing apparatus is also capable of selecting processor halt conditions, and setting the configuration of the machine.

In order to accomplish the above functions, the invention, in its simplest form, requires only three elements. First, there is required a means for storing the instructions comprising the program which the testing apparatus follows in testing the CPU. IN the preferred embodiment, firmware is used for non volatile storage of the program. Second, there is needed a means for entering the data, addresses and commands to select the functions to be performed by the testing apparatus and to display data from the unit under test indicating its performance. Finally, there is needed a means for processing the data, addresses and commands coming in from the second means and for performing the sequence of instructions stored in the first means relating to the desired test. This third element must then output the proper data to the unit under test to cause the desired events in that unit. This third means must also receive data from the unit under test relating to its performance and transfer this data to the second means for display. Such data typically would be the contents of a memory location or internal register, or it could be the conditions of a selected set of control points.

These three elements are coupled together in simple fashion to form the testing apparatus. Typically, the third means is a microprocessor, but it could be any digital computer. The data bus of the microprocessor is coupled to the second means for receiving from it the data, commands and addresses for controlling the system. The microprocessor is also coupled to the first means by the data bus and an address bus so that the commands from the second means can be decoded to form the starting address for a sequence of instructions designed to carry out the command. This address is supplied to the first means, and the instructions stored at that address is returned to the microprocessor via the data bus for execution. The data bus is also coupled to the unit under test, usually through a specially designed interface for that particular unit. Data is sent and received over this link by the microprocessor during execution of the instructions. This data causes the specific tests or operation to be performed by the unit under test. Then, if a Read has been ordered, data relating to the performance of the machine will be transferred back to the microprocessor via the data bus for transfer to the second means for display.

The preferred embodiment of the invention is slightly more complicated than the above described simple form. Although there are more elements in combination, the basic operation described above still holds true. In the preferred embodiment, a programmable read only memory (PROM) is used to store the instructions to be executed by the microprocessor. The microprocessor is coupled to the PROM via the address bus and a data bus. When the microprocessor enters the fetch cycle, an address is supplied to the PROM via the address bus, and the instruction stored at that address is transferred back to the microprocessor via the data bus.

Three possible ports for receiving information from the terminals are used in the preferred embodiment. Data, commands and address information can be sent to the testing apparatus either from the portable maintenance panel or from a computer terminal located in the vicinity of the unit under test or from a computer terminal located any distance from the unit under test but coupled to the testing apparatus via a communication network. In the alternative, a computer programmed with a predetermined sequence of tests could replace the computer terminals for sending streams of commands, data and addresses to the testing apparatus. Two universal synchronous/asynchronous receiver transmitter chips are used as terminal ports to interface between the data bus of the microprocessor and the serial data line from the local or remote computer terminals. The USART coupled to the remote computer terminal also monitors the ring line of the telephone system used in the preferred embodiment. The purpose of these USART's is to convert information coming from the computer terminals in serial format to parallel format data for transfer to the microprocessor on the data bus. They also serve to signal the microprocessor via a control signal when a data word has been received. The USART's also convert data being transmitted from the microprocessor to the computer terminals for display from the parallel format of the data bus to the serial format necessary for transmission over the telephone lines. The USART sends a control signal to the microprocessor indicating when a word has been transmitted and that the USART is ready to receive another word.

The third means of controlling the testing apparatus is by means of the portable maintenance panel. The maintenance panel has a limited keyboard for entering data, command and address information for purposes of controlling the operation to be performed by the testing apparatus. The portable maintenance panel also has a means for displaying the data, command and address information that has been entered and individual LED's for displaying prompting and status signals from the microprocessor. The means for display also displays data received from the unit under test relating to its performance. The maintenance panel is linked to the microprocessor via a bidirectional data bus and the address bus. The address bus controls which display device on the maintenance panel displays the data.

In the preferred embodiment, a random access memory (RAM) is coupled to the microprocessor via the data and address busses to act as a scratch pad memory for temporary storage of information necessary to the operation of the system. In some other embodiments, the microprocessor may have on-chip RAM or a minicomputer with associated RAM might be used.

The preferred embodiment also incorporates a timer utilizing three counters. One counter is used to generate an interval timing signal for use by the microprocessor. The other two counters are used to generate baud rate clock signals for use by the USART's.

The preferred embodiment uses an Intel 8085 microprocessor having an eight bit data/address bus and an eight bit adddress bus. The sixteen bit addressing capability is achieved by the use of an address latch coupled to the data/address bus. The address latch outputs the lower half of the address used in an operation, and the eight bit address bus carries the upper half. The sixteen bits of address form the ABUS which is coupled to the RAM and PROM. The sixteen bits of address bus are also coupled to an address decoder which is used to generate select signals for the RAM, PROM, maintenance panel and for CPU I/O operations. These select signals, along with the various control signals sent from the microprocessor to the other elements in the system, and those control signals sent from the other elements in the system to the microprocessor comprise a control bus. These control signals allow the microprocessor to address each individual element in the system without having more than one element at a time attempting to use the common busses. The control bus also allows the microprocessor to be informed of the occurrence of significant events through the occurrence of interrupt signals indicating the arrival of data, command and address information from the maintenance panel or either of the computer terminals.

Finally, there are provisions in the preferred embodiment for coupling the address, data and control busses of the system to a board tester unit for automatic testing of the testing apparatus itself by another automated test system.

BRIEF DESCRIPTION OF THE DRAWINGS

FIGS. 3A–3C are tables of some of the I/O addresses used by the testing apparatus and read and write operations from and to the tested unit.

FIGS. 3D–3E are tables of some of the commands used in controlling the testing apparatus.

FIGS. 4 through 22 comprise a logic diagram of the testing apparatus less the logic of the maintenance panel.

DETAILED DESCRIPTION OF THE PREFERRED EMBODIMENT

The disclosed system is capable of being adapted to test any type of unit of any type of data processing system merely by changing the firmware and designing a special interface between the testing apparatus and the unit to be tested.

The testing apparatus causes events in the tested unit and displays data from that tested unit indicating the correctness of the performance thereof by performing a number of input/output operations between the mircrprocessor in the testing unit and the unit under test.

Figure 1:
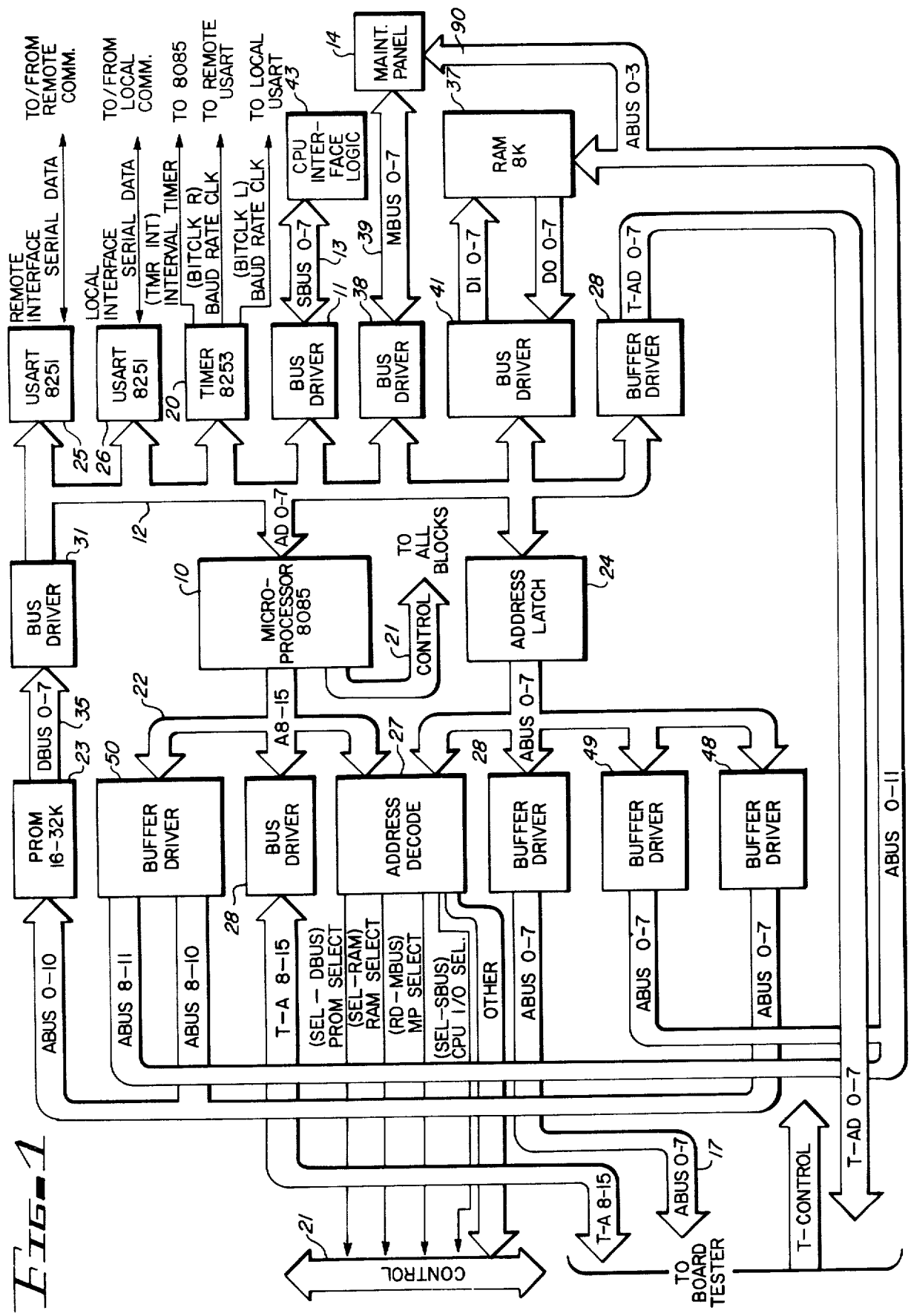
FIG. 1 is a block diagram of the preferred embodiment of the testing apparatus.

In FIG. 1, microprocessor 10 is coupled to bus driver 11 via data bus 12. An eight bit bidirectional bus 13, designated the SBUS, couples bus driver 11 with a specially designed interface for the tested unit. The output operations performed by microprocessor 10 cause various bit patterns to appear on SBUS 13. These in turn cause selectable events in the tested unit. It is the function of the interface for the tested unit to collect and format this data for writing to the proper bus or test input of the tested unit to cause the desired event. FIGS. 3A-3C show the I/O operations performed by the microprocessor and their I/O addresses. Data columns 0 through 7 indicate the meaning of various bits on eight bit SBUS 13 during each individual I/O operation.

The capabilities of the system are reflected in the I/O operations of FIGS. 3A-3C. Data or addresses can be written to the unit under test, or any one of a number of stop on fault conditions can be set. Further, any internal register or memory location can be displayed by setting a predetermined bit pattern on the CPU display control bus.

Any internal unit of the unit under test can be enabled with the write operations having I/O addresses A5 and A6. The CPU flag control operations can be used to write bits to the proper input of the tested unit to put any internal unit in the step mode, select timing margins, or set various stop on address conditions.

The CPU flag status read operation, address $A\phi$, enables the testing apparatus to determine what internal units are in the step mode and which, if any, stop on address or stop on fault conditions are set. It can also be used to determine if the CPU is in the DIS state. This state requires an interrupt to restart processing. CPU flag status read also determines whether display of an internal register is possible by checking the busy status of the address register.

The CPU display bus read operations allow the testing apparatus to read the data in the internal register or memory location selected by the write operations to the CPU display control bus. The seventy-two bit display bus in the CPU also carries control point information to the CPU interface where it can be read eight bits at a time by the microprocessor in the testing apparatus. This information indicates the status of various internal control points.

The MP data display write operations show the I/O addresses used by microprocessor 10 in writing data to be displayed on maintenance panel 14. For example, referring to FIGS. 1, 2 and 3, the MP data display write operation having an I/O address of 00 (hex) would light data display locations 0 and 1 indicated as 15 and 16 in FIG. 2. The I/O address of 00 (hex) would indicate that the eight binary bits represented by the address 00 (hex) would appear on the eight light lines of address bus 17 in FIG. 1. These eight address bits would direct the eight data bits on data bus 12 to display locations 15 and 16 in FIG. 2. Display location 15 displays in octal the first three bits on data bus 12 (indicated as display 0 at 17 in FIG. 3). A similar situation exists for the MP address display and MP command display. In these write operations, data indicating the address and command involved in a particular operation is directed to displays 18 and 19 respectively, in FIG. 2.

The structure and operation of the interface to the unit under test is unique for each type of unit tested. That is, the interface to a CPU would be different than that for an SCU. As seen from FIG. 3, the ZMP data bus to and from the CPU for which the preferred embodiment was developed is thirty-six bits wide, and the MPA address bus to the CPU is thirty-four bits wide. Also, there are twenty-four separate stop on fault (FLTSTOP) lines to the CPU, and a forty bit wide display control bus DCL. There are sixteen separate CPU enable control lines to enable various units in the CPU, and there are thirty-six separate flag lines that the testing apparatus can write to, to set various conditions such as overlap, stop on address, step mode, timing margins and various control signals such as scope repeat, execute switches and initiate commands. Finally, there is a seventy-two bit display bus BCP for carrying data from the CPU regarding the contents of internal registers. The thirty-six bit ZMP bus also carries data to and from memory locations. Since all read and write operations by the testing apparatus must read or write from one of these busses, and since the SBUS is only eight bits wide, it is the function of the CPU interface to collect and format data passing to and from the testing apparatus such that the testing apparatus can read and write from any of these busses using only the SBUS.

The testing apparatus is much simpler and faster to use than the prior art maintenance panels. Maintenance panel 14 is only one manner of controlling the testing apparatus since, as noted earlier, the testing apparatus is also supported by two E1A-RS232 terminal interface USART's. They can operate asynchronously at selected baud rates between 110 and 19,200 bits per second and synchronously at baud states up to 64K bits per second.

Figure 2:
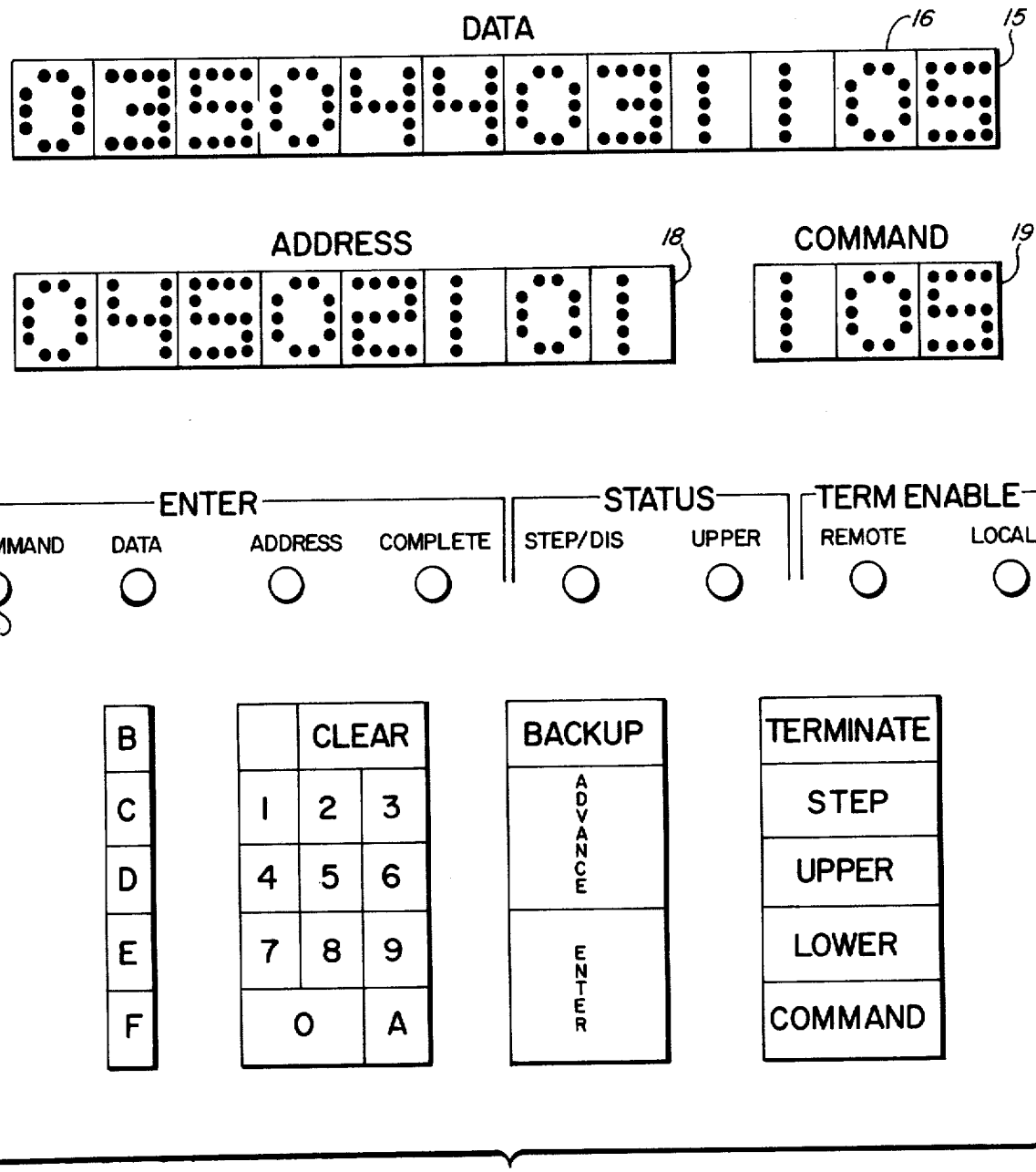
FIG. 2 is a drawing of the front panel of the maintenance panel.

Maintenance panel 14, as shown in FIG. 2, has a twenty-six key keyboard manufactured by Microswitch for entering data, addresses and commands. There is also a thirty-six bit octal data display, a twenty-four bit octal address display and a twelve bit hexadecimal command display. Finally, there are eight discrete indicator LED's that prompt the operator and provide condition status. In the preferred embodiment, the keyboard employs Hall Effect keys that require only a light touch for activation. The data, address and command displays are 4×7 matrix LED displays, while the prompting and status indicators are standard panel LED's. Maintenance panel 14 is connected by a cable to a receptacle mounted on the CPU cabinet which in turn is connected to the logic board within the CPU that holds the microprocessor and associated logic of the testing apparatus. Maintenance panel 14 can be either hand held or mounted on a bracket attached to the CPU cabinet. The testing apparatus logic board, which the maintenance panel controls, recognizes when the maintenance panel is attached to the system. When the firmware recognizes that the maintenance panel has been attached, timer 20 in FIG. 1 is selected and starts a time-out period resulting in the signal TMR-INT which is coupled via control bus 21 to an interrupt input of microprocessor 10. Receipt of this interrupt signal causes microprocessor 10 to activate maintenance panel 14.

Operation of the maintenance panel requires reference to a list of command codes for the various operations. The keyboard shown in FIG. 2 has sixteen alphanumeric keys used for entering these command codes. The nine function or control keys to the right of the alphanumeric keyboard are used to provide control information to microprocessor 10. Only octal keys 0 through 7 are used when entering data or address information.

The nine control keys perform the following functions. The "enter" key is depressed after each entry of information such as entry of a command code, data, or an address. The "command" key signals that entry of a command is desired. After the operator depresses the key, a command code selected from the list is entered using the alphanumeric keys. For example, when the operator wishes to read a particular location in main memory, he depresses the command key. Referring to FIGS. 2 and 28, it is seen that when the microprocessor 10 senses depression of the command key it dispatches a prompting signal to light the "command" LED indicator thirty-six in FIG. 2. When the operator sees the command LED light, he keys in the hexadecimal command code. The firmware then inputs this command and decodes it at a first level. Then, depending upon what type of command it is, the firmware directs another prompting signal to the maintenance panel if data or an address or both are necessary to the completion of the command. As the operator keys the command code in, it shifts into command display 19 allowing the operator to verify his entry. Similarly, as the operator keys in any data necessary, it shifts into the data display register, and likewise for any address information. After all data, address and command information is keyed in, and the operator is satisfied with his entries, he depresses the "enter" key and the information is then accepted by the microprocessor.

A list of some of the commands and their corresponding command codes is shown in FIGS. 3D and 3E. The scroll position commands replace the prior art data point and control point rotary switches. In the prior art maintenance panel, a rotary switch was used to select the batch of internal registers in the various units within the processor that were to be displayed. Likewise, another rotary switch was used to select one batch of a plurality of batches of control points to be displayed. Now each position of these rotary switches is replaced with a scroll position command.

The set of commands can be divided into three major groups. They are: commands to read and write from memory locations; commands to display the internal registers of any of the internal units of the unit under test such as the control unit, decimal unit, virtual unit, etc; and commands to change the configuration of the unit under test. These configuration commands have command codes beginning with F (hex) and include commands: to select the step mode in any of the internal units of the tested unit; to display or alter the address on the address bus MPA; to display or alter the data on the display bus or alter the stop on fault selection; to display or alter the timing margins selection; to display or alter the stop on address selection; to display or alter the cache selection; to display or alter the inhibit overlap selection; to enable the remote terminal; and to clear initialize; control initialize; and execute command or execute faults.

Figure 23:
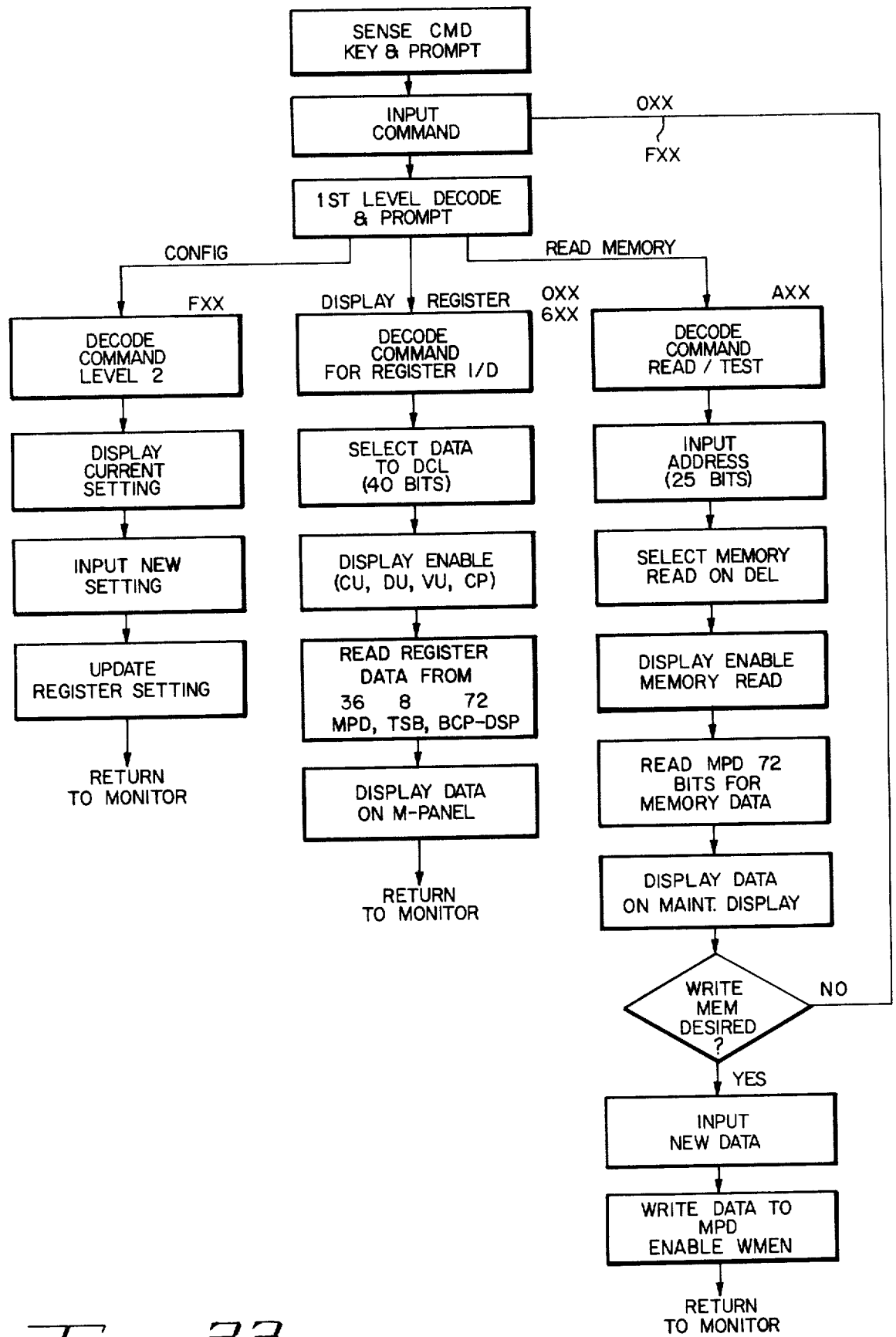
FIG. 23 is a flowchart of the program used by the testing apparatus.

The three main processing streams of the firmware embodied in PROM 23 of FIG. 1 are shown in FIG. 23. When a read memory command having a command code beginning with A (hex) is received, a second level decode is performed to determine whether the command is one to read the memory location or to "test" the memory location by continually addressing it and reading it. The purpose of this "test" command is to allow continuous reading of a memory location so that if there is some difficulty with reading that location, the field engineer can use an oscilloscope to trace through the logic pathways used in addressing and reading the location to find the problem. Next, the firmware prompts the operator by lighting the "address" LED in FIG. 2 whereupon the address is keyed in by the operator. Microprocessor 10 then sends the address to the CPU and does some write operations to the DCL bus. The purpose of these I/O operations is to set up the proper bit pattern on the DCL display control bus to cause the CPU to perform a memory read. The firmware then guides the microprocessor to perform the CPU enable control write operation necessary to set the display enable bit. FIG. 3A shows that this would be a write operation to hex address A5 with the zero bit of the SBUS set at 1 and all remaining bits set at 0. The next step is a number of read operations from hex addresses 80 through 85 to receive the data in the selected memory locations from the CPU via the MPD bus. This data is then displayed on the maintenance panel by doing a number of write operations to addresses 00 through 05 hex shown as the MP Data Display commands in FIG. 3. These operations direct the seventy-two bits of data received from the CPU, thirty six at a time, to the octal display for data. Each data display location displays three of the thirty-six bits received in octal format. Since, only thirty-six bits can be displayed at one time, when the other half of the data is to be displayed, the operator presses either the "upper" or "lower" command key shown in FIG. 2. This causes the firmware to shuttle the remaining thirty-six bits to the data display on the maintenance panel.

It is also possible to write to any memory location. The next step in the rightmost branch of firmware processing sequence of FIG. 23 is to determine whether a write operation is desired. The firmware assumes that a write is desired unless the operator presses the "terminate" key shown in FIG. 2. If "terminate" is pressed, the firmware returns to the input command mode and waits for the next command. If not, the firmware lights the "data" LED in FIG. 2 whereupon the operator keys in the new data to be written to the selected address location. When the operator presses "enter", the data in the data display on the maintenance panel is written to the memory location having the address displayed in the address display. This data is written on the thirty-six bit MPD bus in the CPU under test, using the write operations having addresses 80 through 85 (hex) shown in FIG. 3. Upon writing this data to the memory location, the microprocessor returns to the input command mode of the firmware.

If a display register having a command code beginning with the numbers 0 through 6 is received, the flow of processing proceeds down the middle branch of FIG. 28. The first step is to decode the command for the register ID identifying which internal unit of the CPU and which register therein will be involved. The next step is to select the data to be placed on the DCL bus to cause various switching events to occur in the CPU enabling access to the desired register. The final steps are to read the data from the desired register via the thirty-six bit MPD bus, the eight bit TSB bus or the seventy-two bit BCP bus, and then display this data on the data display of the maintenance panel. Following display, the microprocessor returns to the monitor to await receipt of the next command.

Processing flow for the operation commands is very simple. The first step is a second level decode to determine the type of operation command that has been received. Next the current setting of the operation is displayed on the maintenance panel. Then, if the operator desires to set a new operation, he inputs a new setting using the maintenance panel keyboard and depresses "enter". At that time, the firmware updates the register setting controlling the operation, and then returns to the monitor to await receipt of the next command. The operation commands select single step mode, set data or addresses for use by the CPU, set stop on fault and timing margin conditions, set stop on address conditions, make cache selections and other such operations.

FIG. 2 also shows an "advance" key and a "backup" key on the maintenance panel keyboard. Some functions, such as the command to read main memory, allow stepping through memory by use of the "advance" key without keying in a new address each time. For example, the operator, after depressing the command key, could key in command code A00 in hex indicating a read/write memory operation is desired. After keying in the command code, the operator would depress the "enter" key at which time the address indicator would be lit by the firmware. The operator would then key in the address in octal format for the location of interest and this address would be displayed in the address display. When the desired address has been selected and displayed, the "enter" key would be depressed again which causes the firmware to light the data indicator LED. Simultaneously, the firmware of the testing apparatus causes the unit under test to fetch the data in the selected memory location and transfer it to the microprocessor which in turn transfers it into the data display. The "advance" key may then be used to step through the memory. Each time the "advance" key is depressed, the address display is advanced by one location and the data at the new address is displayed in the data display.

The "backup" key operates in the reverse fashion. It is active anytime the "advance" key is active. By this, it is meant that only certain command keys are active for certain commands depending upon the particular command involved. For example, if the command was to read a register the "advance" key would not be active because the firmware is programmed to know that depression of the "advance" or "backup" key in this context would be meaningless.

The "step" key is active during processor step functions where the step mode has been selected for an internal unit of the CPU. The particular unit which is placed in the step mode is selected by use of a select step command having a command code F00. After keying in F00, the operator would key in data which would indicate which unit is to be placed in the step mode. Thereafter, each depression of the step key would cause the internal unit of the CPU to execute one step. The step function is released by selecting the F00 command code again, resetting the particular step function bit to zero, and depressing the step key.

The "terminate" key will terminate the display functions such as scroll display or control unit display of internal registers or memory. It is used where the operator does not desire to write new data into the location display. The "terminate" key has no effect on functions such as step, stop on address, stop on fault, or timing margin commands.

As indirectly referred to above, the maintenance panel has eight LED prompting/status indicators. The "command", "data", "address" and "complete" indicators prompt the operator while the "step/dis", "upper", and "term enable local" and "remote" indicators provide status information. The complete indicator notifies the operator that no further operator entries are required and that the maintenance panel is displaying the final results of the command code entries. When lit, the DIS/STEP indicator shows whether the CPU is in a Dis or Step state. The upper indicator lights when the most significant thirty-six bits of a seventy-two bit display are displayed and, when not lit, indicates the lower thirty-six bits are being displayed. Where the entire piece of information to be displayed is thirty-six bits or less, the upper indicator will be lit.

The remote terminal enable indicator will be lit when the remote terminal interface is enabled by a command from the maintenance panel. This command allows communication between the testing apparatus and a remote terminal via USART 25 in FIG. 1. Likewise, the local terminal enable indicator will be lit when the local USART 26 in FIG. 1 is enabled.

Address decoder 27 in FIG. 1 is used to convert address information on address bus 22 into one of four select signals used to enable either the PROM, RAM, maintenance panel or the CPU input/output interface for a transaction with microprocessor 10. Since there is only one set of address and data busses, and since during operations as described above, microprocessor 10 must send and receive address and data information to the PROM, RAM, maintenance panel and CPU input/output interface, some means must be provided to switch onto the bus system only the unit directly involved with the microprocessor 10 during the current operation. This is the function of address decoder 27. Each unit in the system will be assigned to a particular address. When this address appears on address bus 22, a select signal will be issued to that particular unit thereby coupling it to the address and data busses. All other units in the system will be in a high impedance state so as to not load down the bus system or interfere with the current operation.

Board test port 28 in FIG. 1 merely serves to allow connection of the address, data and control busses of the testing apparatus to an external board testing apparatus so that operation of the testing apparatus may be simulated. In this manner testing of the testing apparatus itself may be accomplished.

Figure 5:
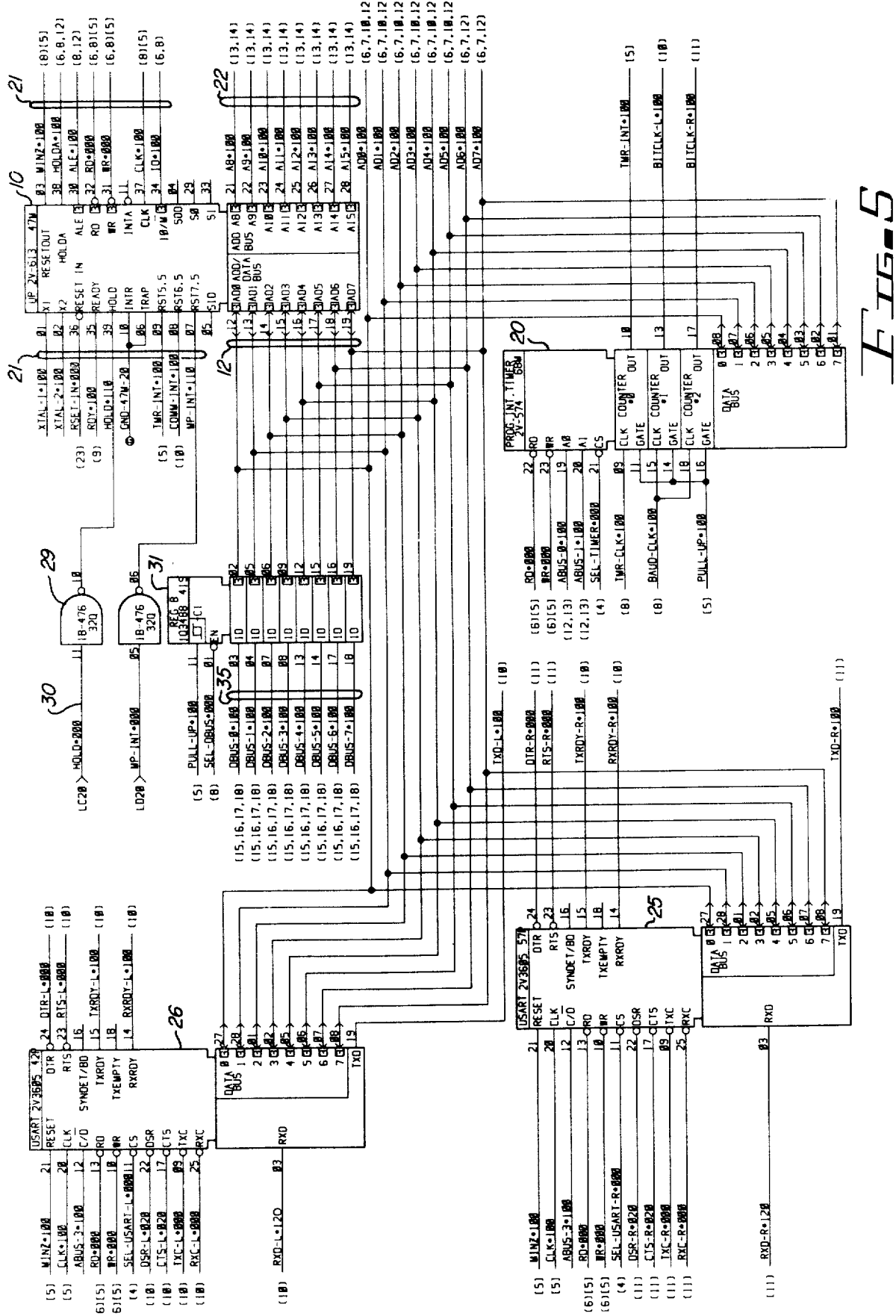

Microprocessor 10 is shown in more detail in FIG. 5. In the preferred embodiment, microprocessor 10 is an Intel 8085 A having an eight bit address/data port 12, eight bit address port 22 and a control port 21 comprised of numerous control input and output ports and three interrupt ports. The microprocessor contains an on-board clock for which the signal lines XTAL-1 and 2 connect to a crystal to set the frequency of this clock. The signal RESET-IN is an input signal which sets the internal program counter to zero and resets the internal interrupt enable and HLDA flipflops. When this signal goes low, the data and address busses and the control lines are in the high impedance state. The microprocessor is held in the reset condition as long as this signal is held low. It is a Schmitt triggered input, allowing connection to an RC network for power-on reset delay.

The signal RDY is an input which is high during a read or write cycle indicating that the memory or peripheral is ready to send data to or receive data from the microprocessor. If this signal is low, the microprocessor will wait for it to go high before completing the read or write cycle.

The signal HOLD is an input which indicates that another master device is requesting the use of the address and data busses. The microprocessor will relinquish control of the busses upon receiving this request as soon as the current machine cycle is completed. Internal processing within microprocessor 10 may continue however. The microprocessor can regain the use of the busses after the HOLD request is removed. When the HOLD request is acknowledged, the address/data, RD, WR, IO, lines are tri-stated. The HOLD request line is connected to the external board test unit via bus driver 29 and line 30 leaving the logic board at LC20. In this manner, an external board tester unit may have control of the busses.

Control signal HOLDA is an output which indicates that the microprocessor has received the HOLD request and will relinquish the busses during the next clock signal. This signal goes low after the HOLD request is removed whereupon the microprocessor takes the busses one-half clock cycle later.

The INTR and TRAP inputs to microprocessor 10 are interrupt inputs which are not used in the preferred embodiment. Rather, a hierarchial interrupt structure having three levels of priority is used. The highest priority interrupt is the RST7.5 input connected to the signal MP-INT. When this signal line goes high, microprocessor 10 is forced to jump to an interrupt routine for servicing maintenance panel 14 of FIG. 1. This interrupt service routine functions to receive commands from the maintenance panel, decode them, send prompting signals to the indicator LEDS on the maintenance panel and to receive data and addresses keyed in by the operator where necessary to completion of the command.

The second highest priority interrupt, RST6.5, is assigned to communications interface USART's 25 and 26. The signal COMM-INT is generated when either USART is ready to transmit a character or has received a character, providing that, prior to that time, a terminal enable command has been received from maintenance panel 14. That is, communications interrupts are enabled only after the operator keys in a terminal enable command.

The lowest priority interrupt port, RST5.5, receives the signal TMR-INT. This signal is coupled to the output of counter zero of programmable interval timer 20 on FIG. 5. This interrupt signal is used by the microprocessor for delay purposes such as where a display is to be sent to one of the communications terminals and displayed there for some predetermined amount of time, such as 10 seconds, and then redisplayed so that the operator can tell if anything has changed. It is also used to prevent the microprocessor from waiting indefinitely for a response from the unit under test which does not occur due to faulty operation. Counter zero is initialized by the firmware to count out a delay of $\frac{1}{8}$ of a second and interrupt the microprocessor at the end of each interval.

The system initialize function is performed by the signal MINZ coupled to the reset output of microprocessor 10. This signal indicates that the microprocessor has received a reset input.

The ALE signal stands for Address Latch Enable. This signal occurs during the first clock state of a machine cycle and latches the address on the data/address bus into the address buffer of any peripheral chip in the system.

The signal RD serves as the read control signal for the system. A low level RD signal indicates to the selected memory or I/O device that the data bus is available for data transfer. This signal is tri-stated during HOLD/HALT modes and during reset.

The signal WR serves as the system write control. When this signal goes low, the data on the data bus is available to be written into the selected memory or I/O location. Data on the data bus is set up at the trailing edge of the WR signal.

The CLK signal is a clock output for use as a system clock. The period of this signal is half that of the crystal coupled to the XTAL-1 and 2 inputs.

The signal I/O serves to inform the system of the microprocessor status. It is low during a memory write or a memory read. It is high during an I/O read or write.

Address/data bus 12 is a multiplexed bus that serves in both an address and data capacity. The lower eight bits of the memory address or the I/O address appear on the bus during the first clock cycle or T state of a machine cycle. Thereafter, during the second and third clock cycles, this bus becomes the data bus.

Address bus 22 serves to carry the eight most significant bits of the memory address. It is tri-stated during the HOLD and HALT modes and during reset.

Bus driver 31 is an octal D-type latch but is used only as a bus driver for the DBUS in this instance. The signal PULL-UP is always high causing the outputs at the right side of the chip to follow the inputs from lines DBUS 0-7. The signal SEL-DBUS serves as the output control to tri-state the outputs when high and enable them when low. This signal comes from the control logic in FIG. 8 coupled with the control bus. Typically, all latches and bus drivers in the system having the identification numbers 1Q3488 can be 74 LS373 IC's in the TTL family.

Communication between the testing apparatus and a computer terminal or other data processing systems located in the general vicinity of the tested unit is accomplished by the use of programmable USART 26 on FIG. 5. This chip can be an Intel 8251 A in the preferred embodiment and is specially designed for data communications in microprocessor systems. It has a parallel format data bus input coupled to address/data bus 12 and also is coupled to portions of control bus 21 in order to send and receive various control signals to and from microprocessor 10 and various other parts of the system. The USART serves to convert from parallel format to serial format data which is being sent from the testing apparatus to a local computer terminal or local data processing system for display. Similarly data being transmitted to the testing apparatus from a local computer terminal or data processing system is converted from serial to parallel format for transfer to microprocessor 10 to control the testing apparatus. The conversions from serial to parallel and from parallel to serial may occur simultaneously.

USART 26 also signals the microprocessor whenever it can accept a new character for transmission or whenever it has received a character for transmission to the microprocessor. The microprocessor can also read the complete status of the USART at any time. USART 26 can operate synchronously or asynchronously in a full duplex mode at selectable information transfer rates.

The USART has double buffered data paths with separate I/O registers for the control word, status word, data in and data out. Microprocessor 10 completely defines the functional definition of the USART by writing to it a set of control words under firmware control. These control words program the baud rate, character length, the number of stop bits, synchronous or asynchronous operation and even/odd/off parity. In the synchronous mode, options are also provided to select either internal or external character synchronization.

The signal MINZ coupled to the reset input of USART 26 will, when high, force the USART into an idle mode. The device will remain idle until a new set of control words is written into the USART by microprocessor 10 to program its functional definition.

The signal CLK is used to generate internal device timing and must be greater than thirty times the receiver or transmitter data bit rates.

A low signal RD informs the USART that the microprocessor is reading data or status information from it. A low WR indicates that the microprocessor is writing data or control words to the USART.

The signal ABUS-3 when read by the USART in combination with the signals WR and RD, defines whether the word on the data bus is a data character, control word or status information. When the signal is high the data bus word is either control or status, and when the signal is low, data.

The signal SEL-USART-L, when low, selects USART 26. No reading or writing can occur until the device is selected. The data bus will float when the signal is high.

The signal DSR-L couples to a general purpose, one bit inverting, input port. Its condition can be tested by the microprocessor during a status read operation. This input is normally used to test modem conditions such as data set ready.

A low signal CTS-L enables the USART to transmit serial data if the TX enable bit and a command bit is set to one. If either TX enable or the signal CTS-L go off during transmitter operation, the transmitter will transmit all the data in the USART written prior to the TX disable command before shutting down.

The signal TXC-L is the transmitter clock controlling the rate at which characters are to be transmitted. In synchronous operation, the baud rate is equal to the frequency of this signal. However, in asynchronous operation, the baud rate is only a fraction of the frequency of this signal. A portion of the mode instruction written to the USART by microprocessor 10 selects either the baud rate factor of 1, 1/16, or 1/64 of the TXC frequency.

Similarly, the receiver clock signal RXC-L controls the rate at which characters are received. In the synchronous mode, the baud rate is equal to the RXC frequency, however in asynchronous operation, the baud rate is a fraction of the RXC frequency.

Modem control such as "data terminal ready" is accomplished by output signal DTR-L. This signal can be set low by programming the appropriate bit in the command instruction word.

The "request to send" control function for controlling a modem is performed by the signal RTS-L which is coupled to the RTS output port. This signal can be set low by programming the appropriate bit in the command instruction word.

The microprocessor must be signaled when the USART is ready to accept a character for transmission. This function is performed by the signal TXRDY-L. This signal can be used to interrupt the microprocessor since it can be masked by TX disable in the control word. Formats for these control words can be found in the Intel Components Data Catalogue. This signal is automatically reset by the leading edge of the signal WR when a data character is loaded from the microprocessor.

Receipt of a character by the USART is signaled to the microprocessor by RXRDY-L. This signal like signal TXRDY-L is coupled through the gating circuitry shown on FIG. 10 to the interrupt input COMM-INT for interrupting the microprocessor when a data transfer is to be made. The microprocessor's interrupt routine in response to COMM-INT checks the status of the USART to determine whether it is ready to transmit or receive and then performs the proper input or output operation.

Serial format input from whatever device is connected to USART 26 is carried by the signal RXD-L. Serial format output is sent to the device connected to the USART via the signal TXD-L.

USART 25 is also an Intel 8251 A except that it is used to interface with a remotely located computer terminal or other data processing system via a communications network which is capable of transferring data over any distance. In the preferred embodiment, this communication network is the U.S. telephone system. Thus, USART 25 must monitor the ring circuit of the telephone system to enable response by the testing apparatus to a call from the remote terminal or data processing system.

The interplay between USART's 25 and 26 and microprocessor 10 is as follows. Prior to starting data transmission or reception, the USARTS must be loaded with a set of control words generated by microprocessor 10. These control words define the functional definition as noted previously and must immediately follow a reset operation. The control words are split into a mode instruction and command instruction. The mode instruction defines the general operational characteristics of the 8251 A. After the mode instruction is written to the 8251 A, sync characters or a command instruction may be inserted. The command instruction defines a status word used to control the operation of the 8251 A. Both the mode and command instructions must conform to a specified sequence for proper device operation. The format of the command instruction is given at page 12-54 of the 1978 Intel Components Data Catalogue which publication is incorporated herein by reference.

Neither USART can begin transmission until the TX enable bit in the command instruction is set and it has received a "clear to send" input via the signal CTS.

As noted earlier, during asynchronous operation of USARTS 25 and 26 the baud rate is related to the clock frequency of the signal TXC. A clock signal for each USART is generated by programmable interval timer 20 in FIG. 5. In the preferred embodiment, this device is an Intel 8253. This device features an eight bit buffered bidirectional data port for interfacing the timer with the system data bus 12. The data bus buffer serves to receive data words from microprocessor 10 which program the modes of the chip, load the count registers, and hold the count values for reading by the microprocessor. The signal SEL-TIMER, when low, selects the timer so that operations can commence. A low signal RD informs the 8253 that the microprocessor is inputting data in the form of a count value. A low signal WR informs the chip that the microprocessor is writing data to the timer data bus buffer in the form of mode information or loading the counters. The signals ABUS-0 and ABUS-1 are coupled to the address bus of the microprocessor by circuitry in FIGS. 12 and 13 and serve to select one of the three counters to be operated on or to access the control word register for mode selection by microprocessor 10.

Each counter in the interval timer is a single, sixteen bit, pre-settable, down counter. The input, gate and output ports are configured by the selection of modes stored in the control word register coupled to the data bus buffer. Each counter can count in binary or BCD, and each can operate in a separate mode configuration from the others. The microprocessor, during an initialize routine, must send a set of control words to initialize each counter of the 8253 with the desired mode and initial count information. In the preferred embodiment, counter zero is set to the interrupt on terminal count mode. Counters 1 and 2 are programmed to be divide by nine counters. The output signals BITCLK-L and BITCLK-R from counters 1 and 2 are coupled to USARTS 25 and 26 through circuitry shown in FIGS. 10 and 11 to become their respective signals RXC and TXC.

Figure 8:
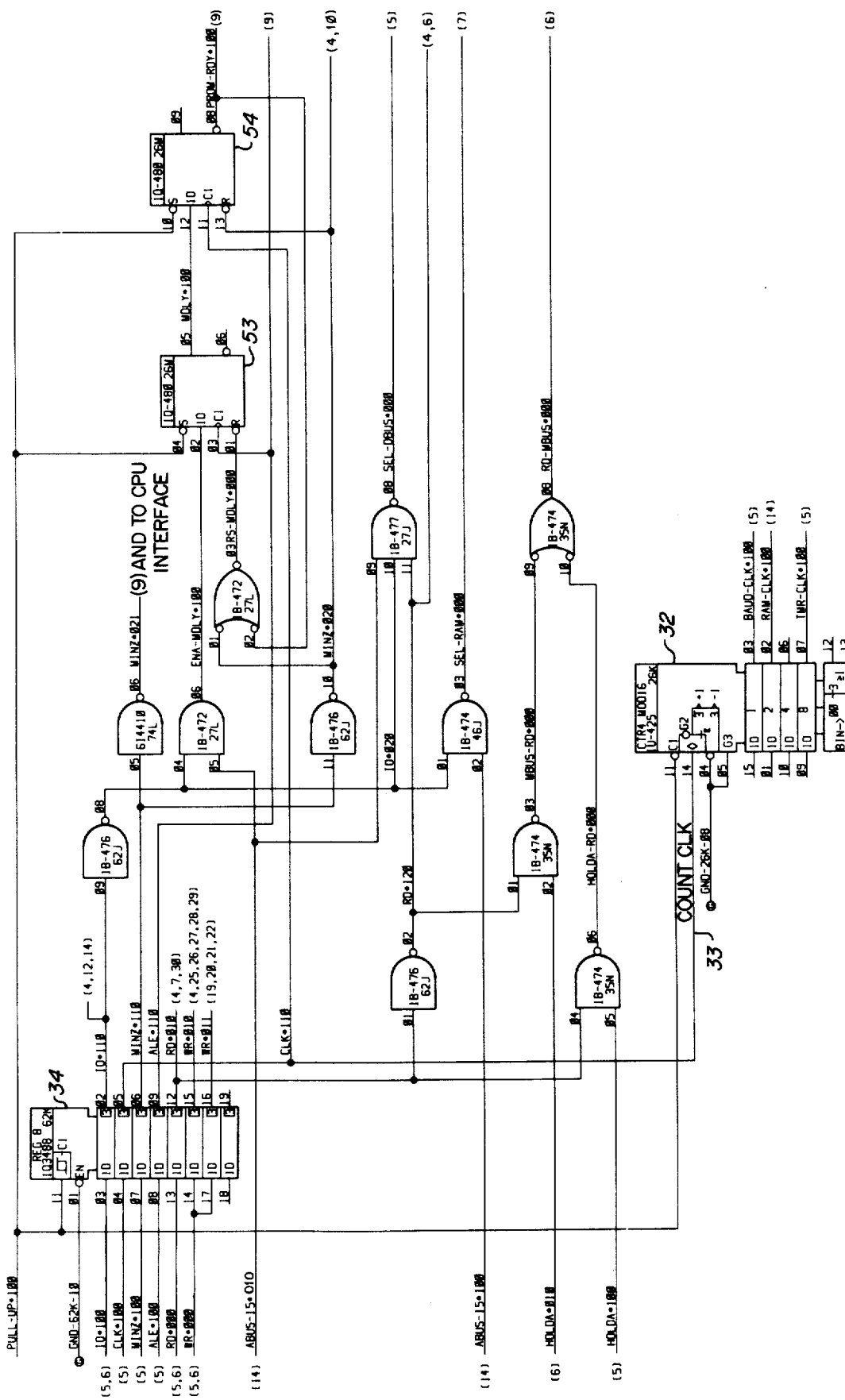

The input signal BAUD-CLK to counters 1 and 2 is a 1.536 megahertz signal derived from modulo sixteen counter 32 in FIG. 8. Counter 32, in the preferred embodiment, is a 74 LS191 four bit binary synchronous bidirectional counter where the four counter stages are triggered on a low to high level transition of the count clock input on line 33. This count clock input is derived from the system clock signal CLK from microprocessor 10 through eight bit octal latch 34. The input signal TMR-CLK to counter zero is derived in similar fashion from modulo sixteen counter 32 in FIG. 8. The signal TMR-CLK has a frequency 1/16 that of the count clock frequency on line 33.

Figure 14:
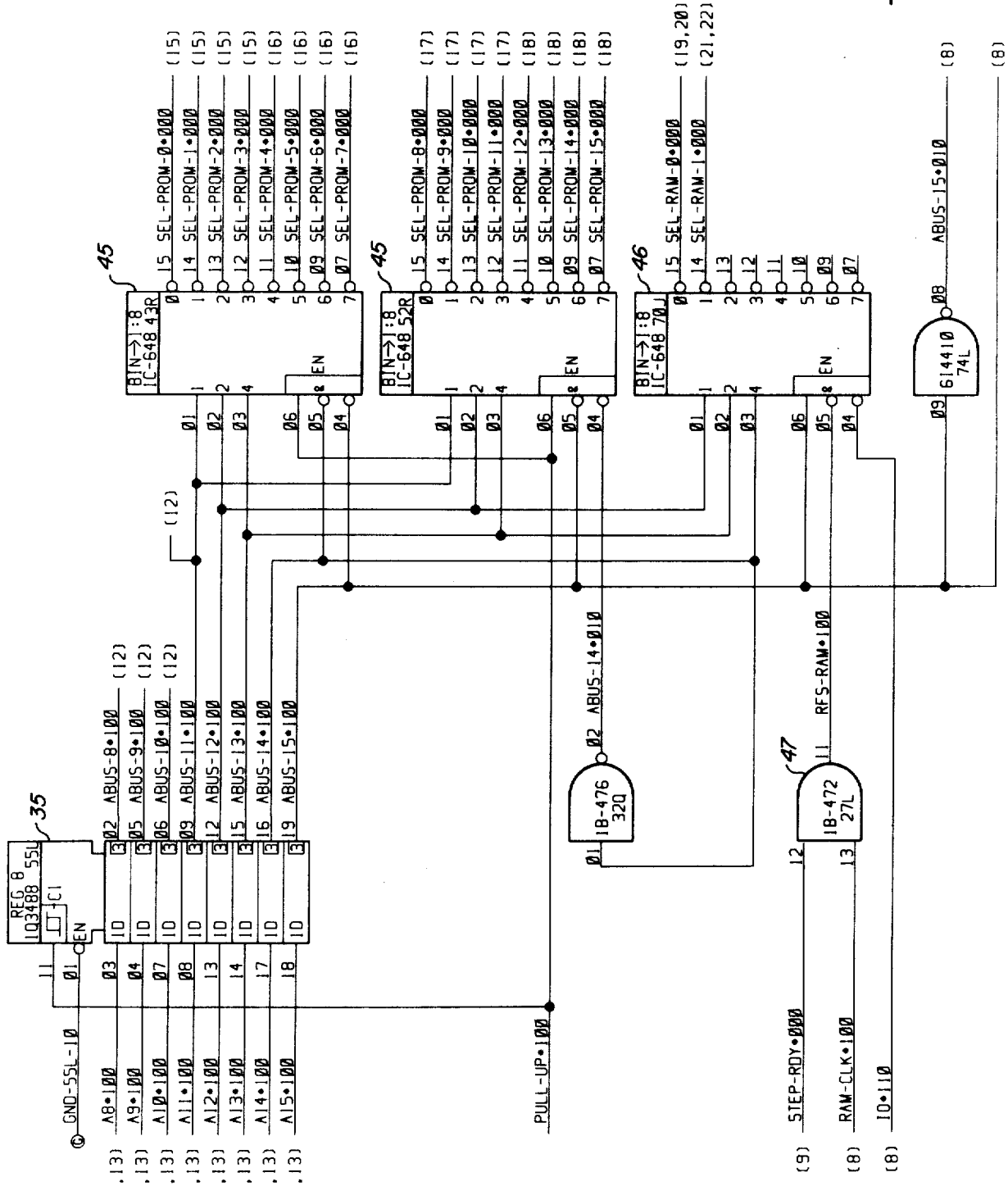
Figure 15:
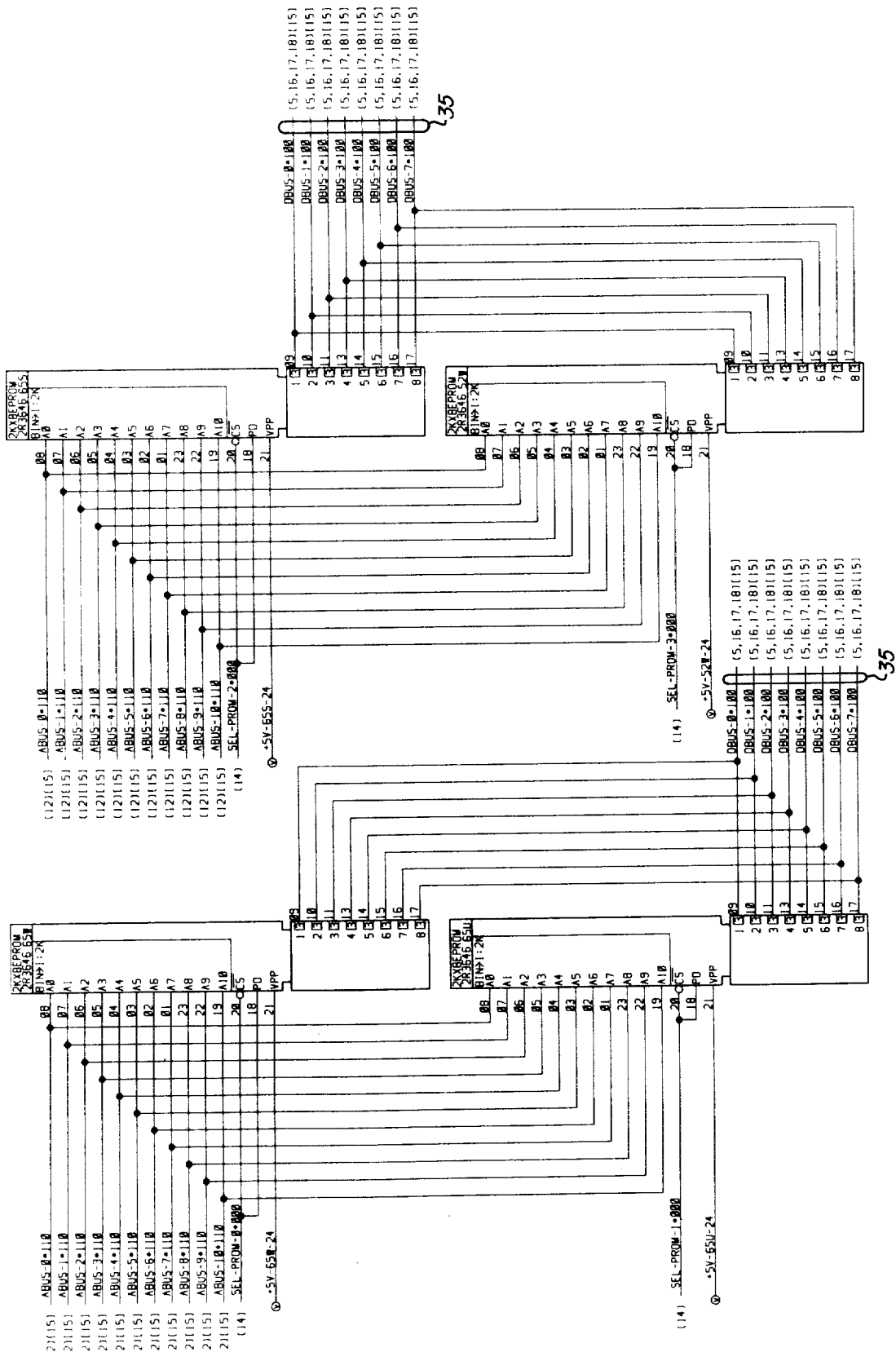
Figure 16:
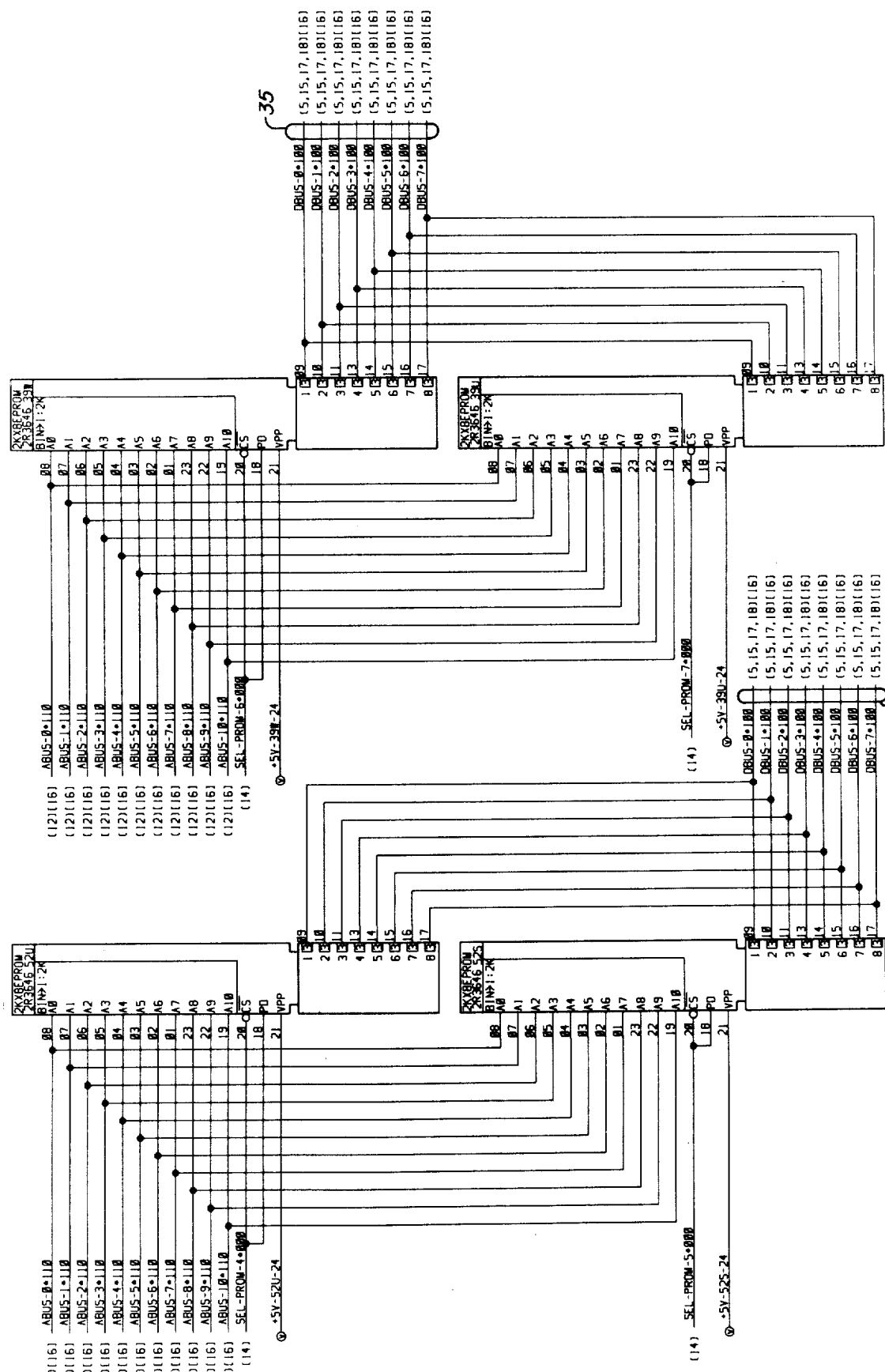
Figure 17:
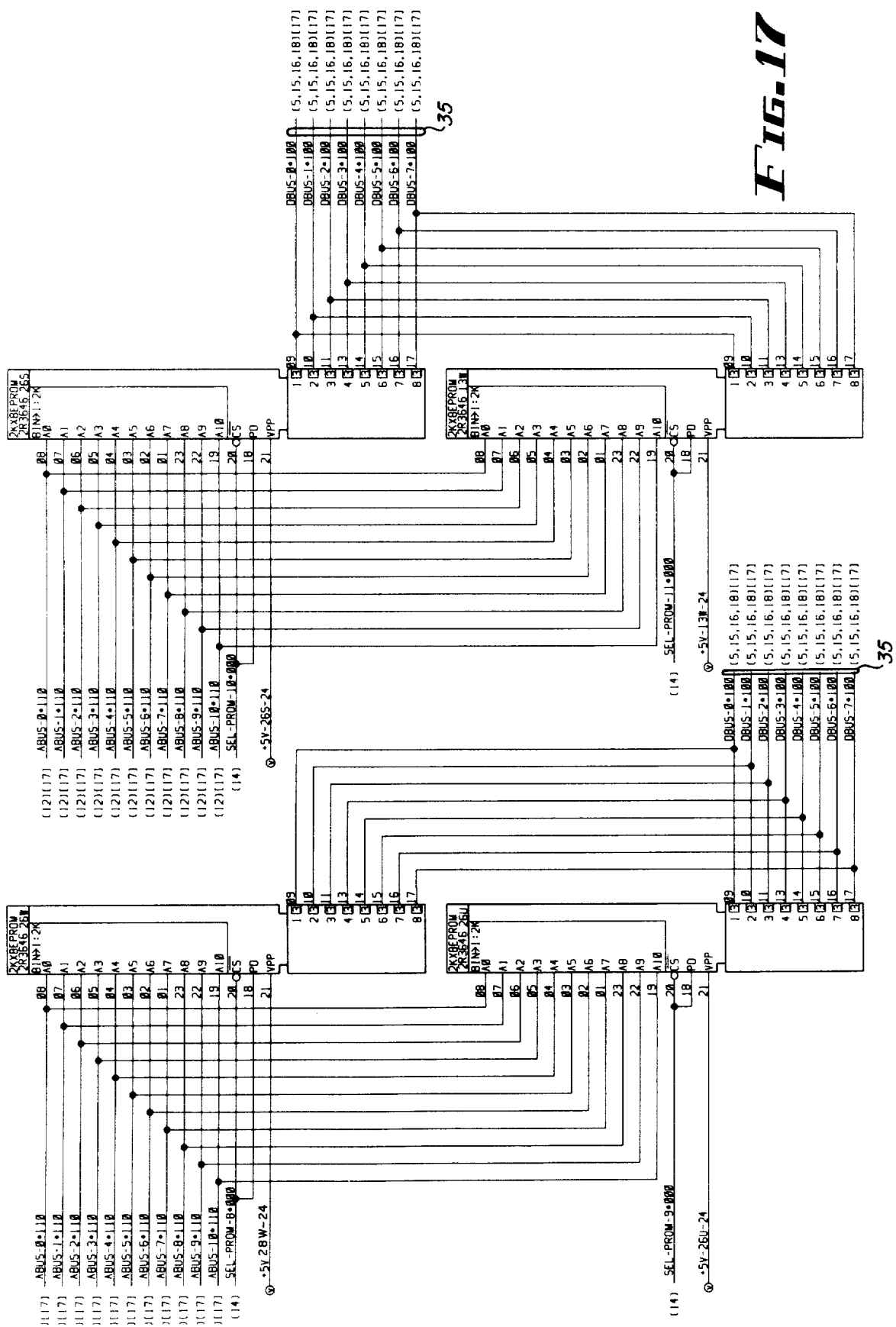
Figure 18:
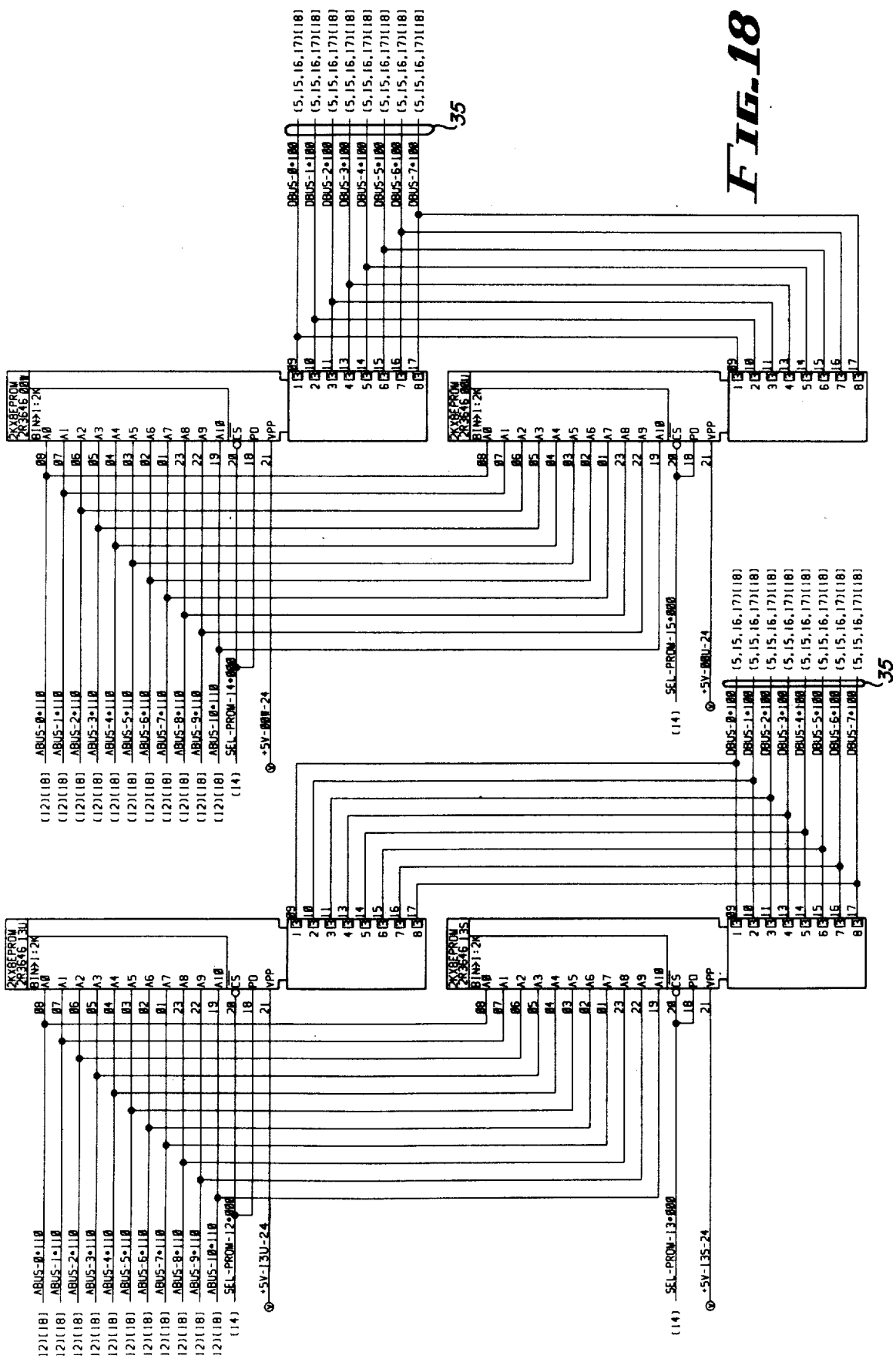
Figure 19:
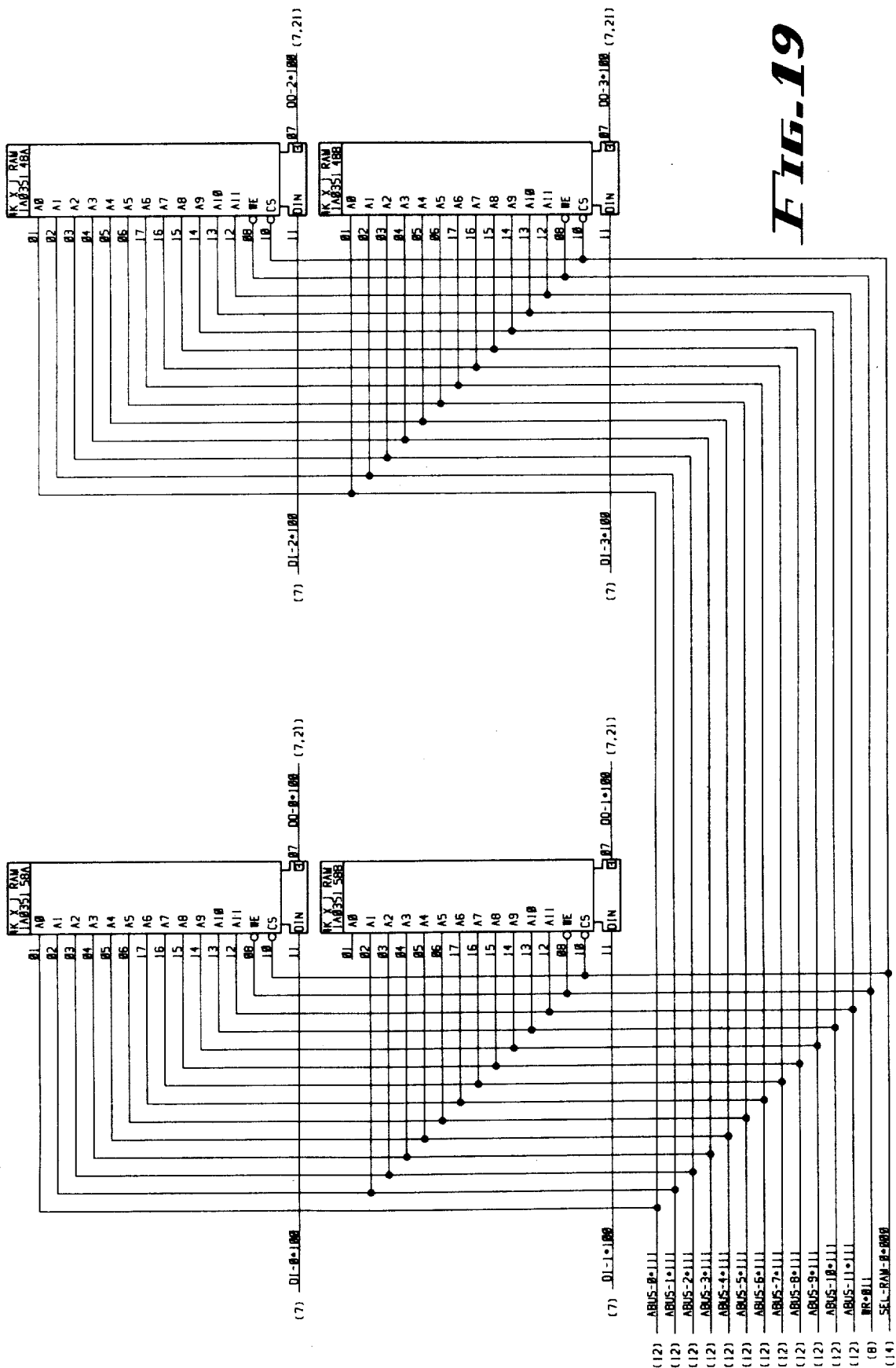
Figure 20:
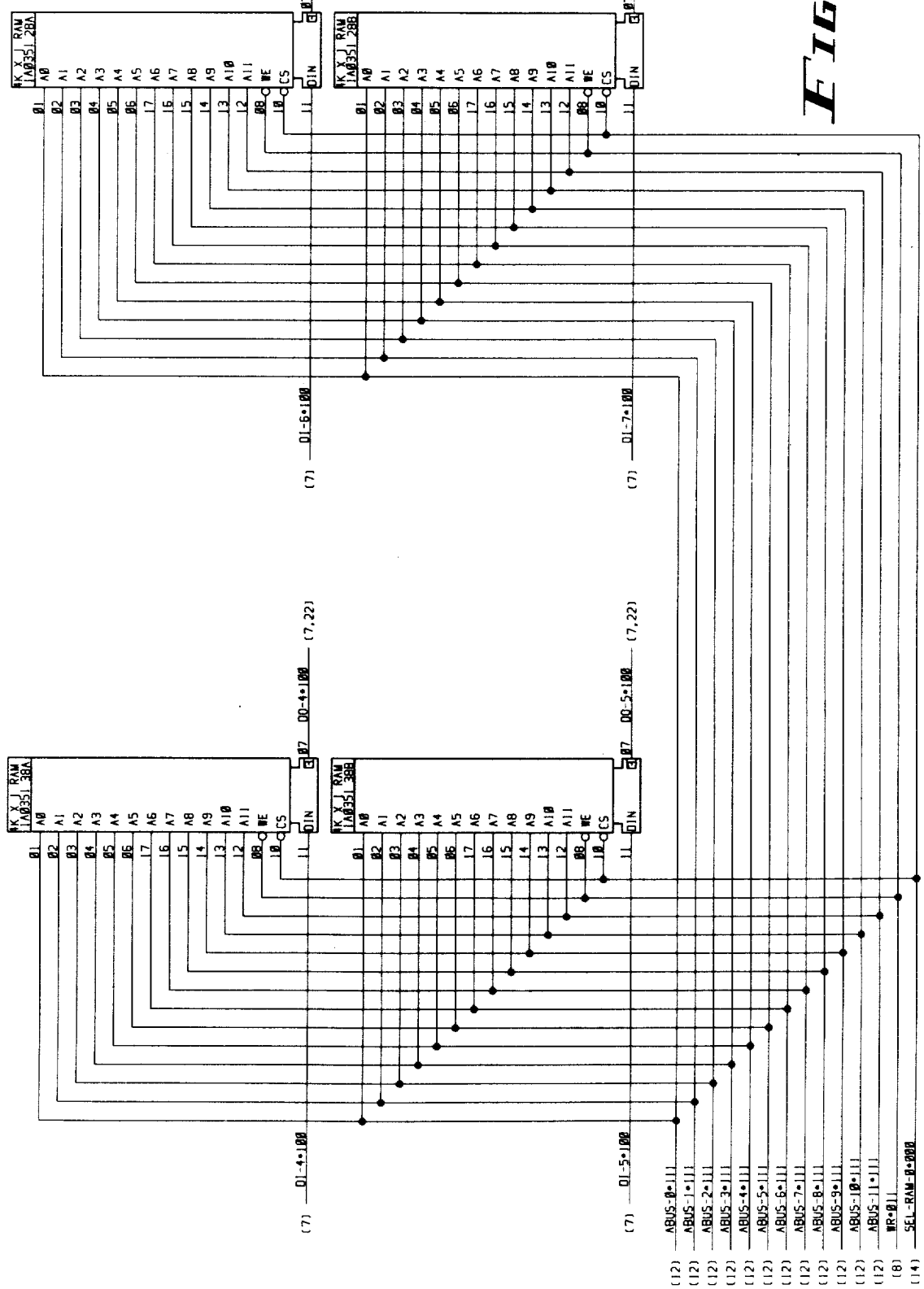
Figure 21:
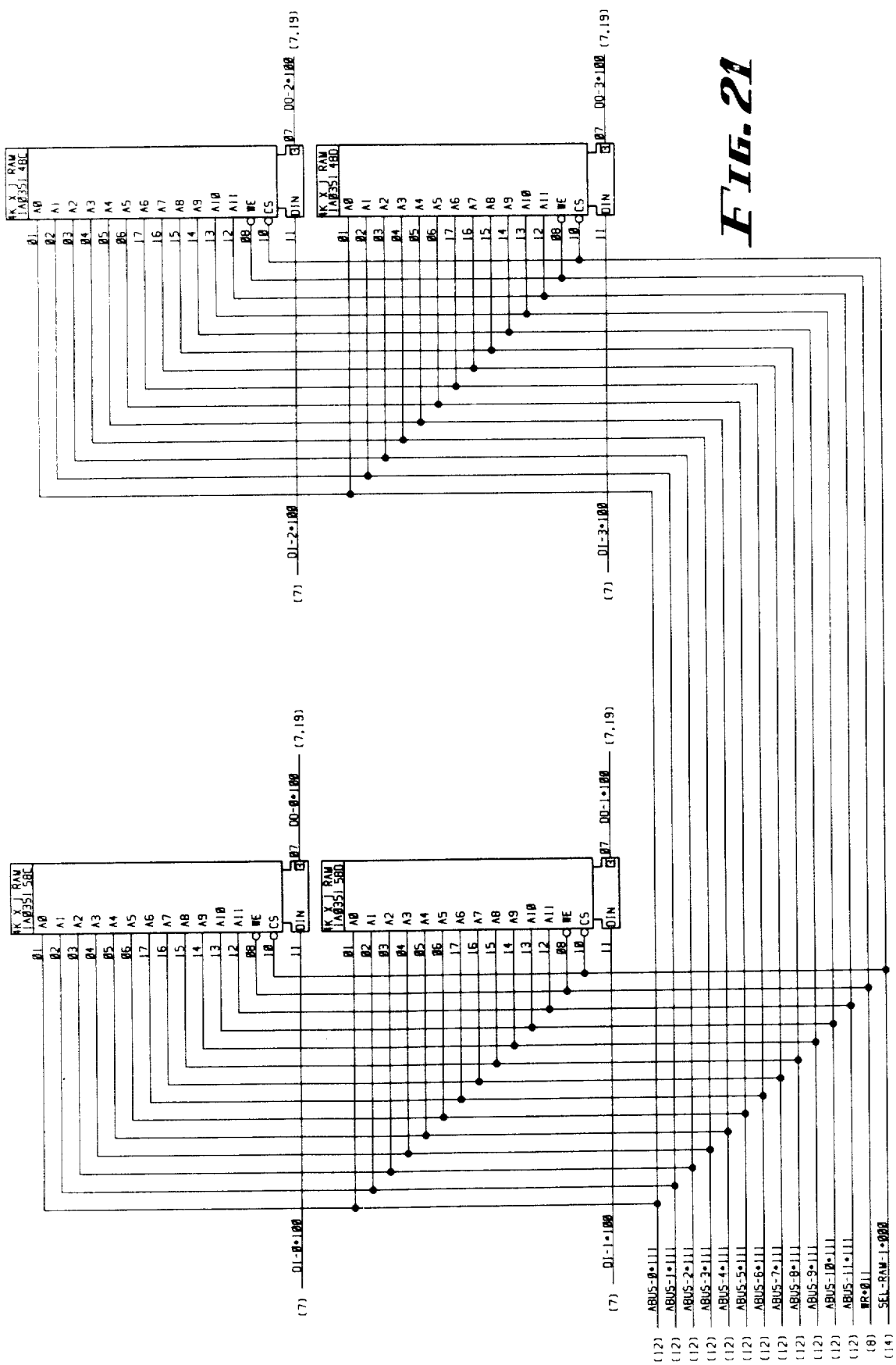
Figure 22:
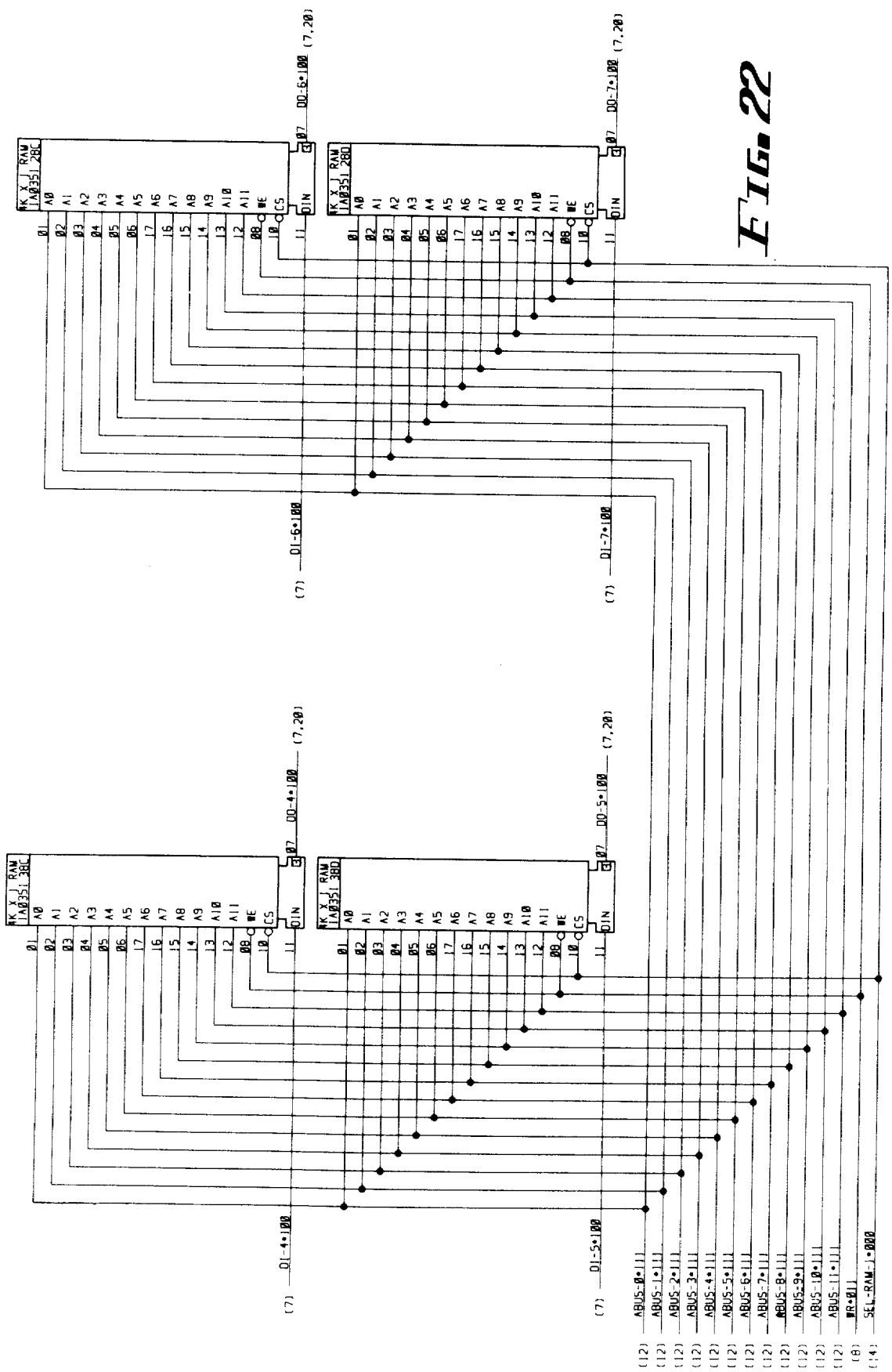

Addressed decode circuitry 27 in FIG. 1 is shown in more detail in FIG. 8. PROM 23 in FIG. 1 is selected via the line SEL-DBUS. This signal is coupled to the enable input of bus driver 31 in FIGS. 1 and 5 and serves to connect DBUS 35 to address/data bus 12. Microprocessor 10 may then retrieve data from PROM 23 shown in more detail in FIGS. 15, 16, 17 and 18. DBUS is connected to the data bus ports of the PROM chips. The signal SEL-DBUS in FIG. 8 goes low enabling bus driver 31 when the signals ABUS-15, IO-020 and RD-120 are all high. The signal IO-100 will be low causing IO-020 to be high when the microprocessor is reading memory and not an I/O location. Likewise, the signal RD-000 will be low causing RD-120 to be high when the microprocessor is reading the selected device. The signal ABUS-15 will always be high when addressing PROM 23 because of the address assigned to PROM 23. ABUS-15 is derived through bus driver 35 in FIG. 14 from the signal A15 which is bit 15 of the upper eight bits of the address bus 22 from microprocessor 10.

The signals RD-MBUS and SEL-RAM are used respectively to select maintenance panel 14 and RAM 37 for an exchange with the microprocessor. Maintenance panel 14 is coupled to address/data bus 12 via bidirectional MBUS 39 and bus transceiver 38 in FIG. 6. The signal SEL-MBUS serves to select bus transceiver 38 when low. Driver inputs 12 allow data, address and command display data to be transferred out to maintenance panel 14 via MBUS 39 while receiver outputs 12 allow data, command and address key data from the maintenance panel via MBUS 39 to be placed on the address/data bus lines AD0-7.

Figure 7:
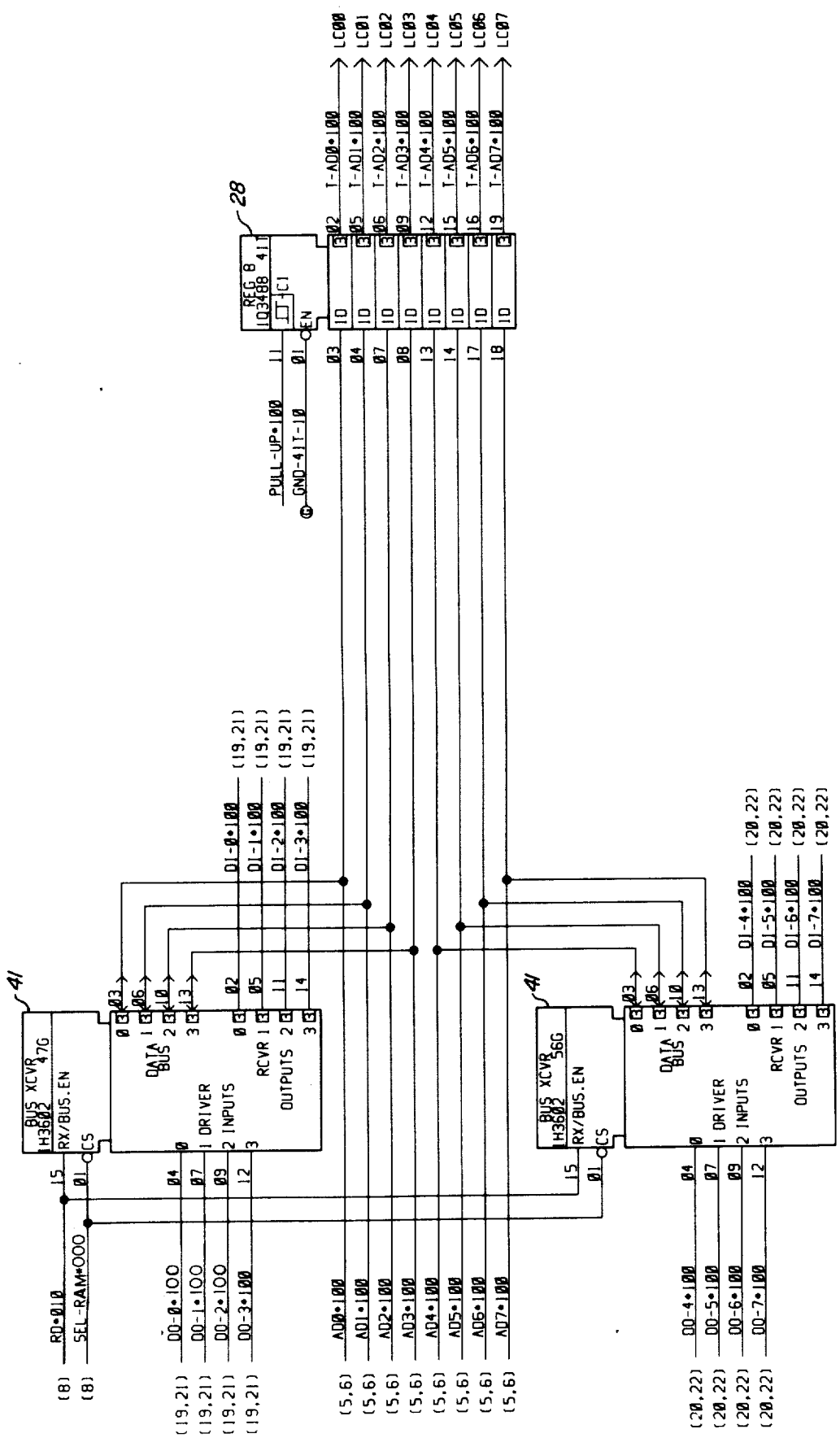

The SEL-RAM signal selects RAM bus transceiver 41 in FIG. 7 when low. This couples RAM 37 shown in FIGS. 19-22 to lines ADO-7 via the data output lines DO$\phi$-7 and data input lines DI$\phi$-7.

Figure 6:
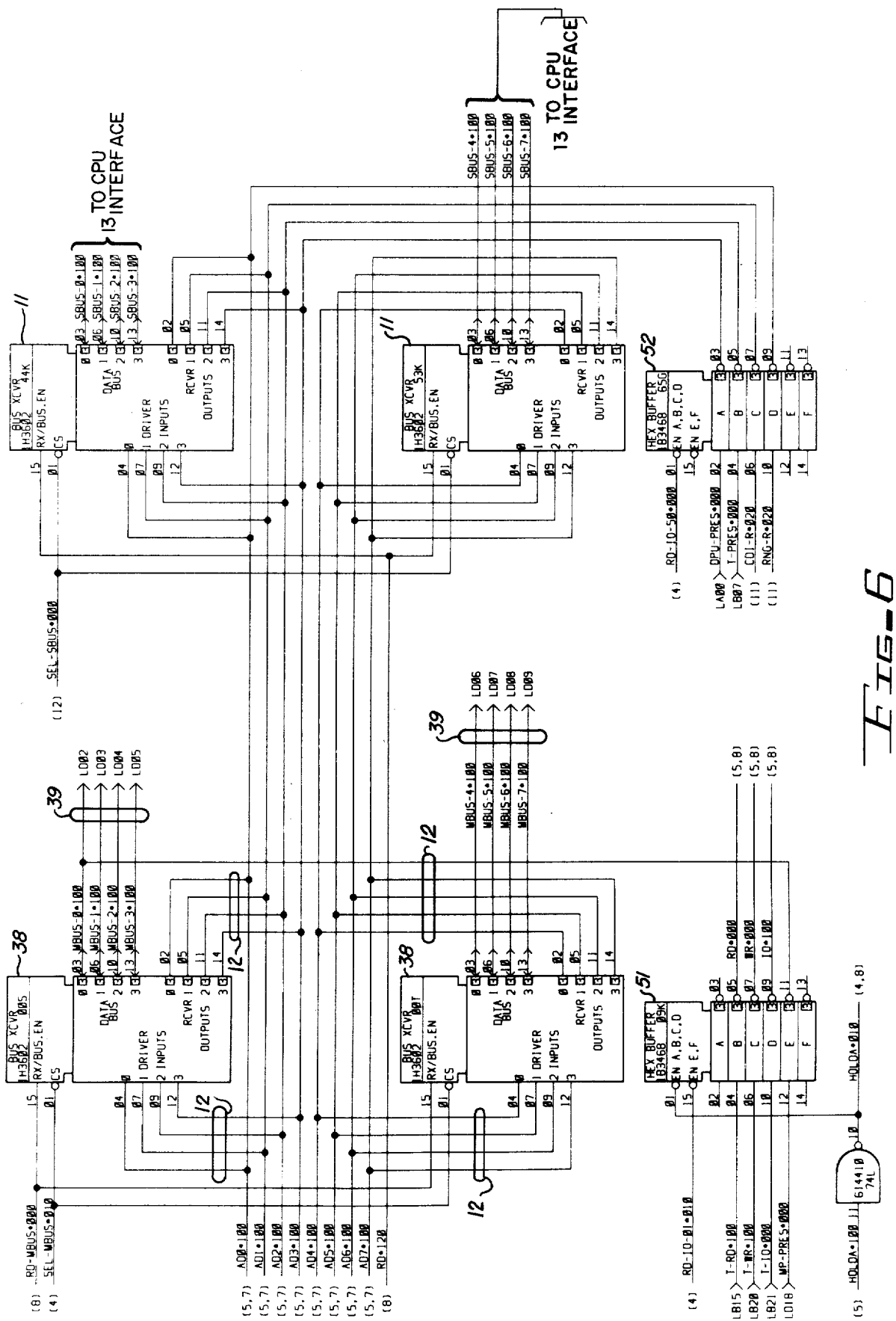

Input/output operations to the unit under test are enabled via the SBUS$\phi$-7 lines and bus transceiver 11 in FIG. 6 when the signal SEL-SBUS goes low. This signal goes low when the input signals IO-11$\phi$ and ABUS-7 to NAND gate 44 in FIG. 12 go high. This would correspond to presenting the address of CPU Interface Logic (43 in FIG. 1) on the AD$\phi$-7 lines. The I/O signal indicates that the address on the address bus in for an I/O operation as opposed to a memory access.

FIG. 7 also shows the port for interface between the address/data lines AD$\phi$-7 and an external board test device is provided by board test port 28 and T-AD$\phi$-7 lines. Pins LC$\phi\phi$-$\phi$7 go off to the interface of the logic board. An interface port for coupling the board tester to the address bus of the system is shown in FIG. 13. Board test port 28 is further comprised of the four bus transceivers shown there in addition to the bus transceiver shown in FIG. 7. The transceivers on the right provide a port for the board tester to access lines A8–15 of the address bus. The transceivers on the left provide a port for the board tester to access ABUS$\phi$-7 lines of the address bus.

The firmware which controls the operation of the testing apparatus is stored in PROM 23 shown in more detail on FIGS. 15 through 18. In the preferred embodiment, sixteen 2K EPROM chips can be used. The address input of each chip is coupled to lines ABUS 0-10 of the address bus. The chip select input of each EPROM chip is coupled to an output of PROM decoder chips 45 in FIG. 14. These decoders are enabled by the 14th and 15th bits of the ABUS, and the signals ABUS-11 through 13 are coupled to the binary inputs of these one out of eight decoders. The bits patterns appearing on bits 11, 12 and 13 of the ABUS cause one of the output lines SEL-PROM-0 through 15 to go low thereby selecting the particular PROM chip containing the desired information. Bus driver 35 in FIG. 14 serves to couple the lines A8 through A15 to lines ABUS-8 through 15 to allow the microprocessor to select the right EPROM chip via its address bus. The information located at the address specified by lines ABUS-0 through 10 is placed on the data bus of the testing apparatus via the lines DBUS-0 through 7.

The scratchpad function of storing data, commands and addresses temporarily during processing by microprocessor 10 is performed by the system RAM 37 which is shown in more detail on FIGS. 19 through 22. The address inputs of the RAM chips are coupled to lines ABUS-0 through 11 of the system address bus. Data input to the RAM arrives on the DIO-7 bus where each one of these lines is coupled to the DIN input of each of the eight 4K × 1 bit RAM chips. Data output from the RAM leaves via the D0-7 bus. The write enable input to each RAM chip is coupled to the signal WR-011 which is derived from the output signal WR from microprocessor 10 via octal latch 34 in FIG. 8. The chip select input of each RAM chip is coupled to either the signal SEL-RAM-0 or the signal SEL-RAM-1 which are output signals from one of eight decoder 46 in FIG. 14. The binary inputs to this decoder are the 12th, 13th and 14th bits of the ABUS. The enable inputs of decoder 46 are coupled to the 15th bit of the ABUS and the signal IO-110. A third enable input signal RFS-RAM is the output of NAND gate 47 in FIG. 14. One input to this gate is the signal RAM-CLK from modulo 16 counter 32 in FIG. 8. This clock signal serves as a RAM refresh signal to turn the enable input on and off in the case where the RAM chips used can be enabled only for a short time before degradation of the data begins. In the preferred embodiment, Intel 2141 HMOS RAM chips are used because there is no limitation on the enable time for these chips. A second advantage is also afforded by the Intel 2141 in automatic reduction in power consumption requirements whenever a chip is deselected.

Figure 12:
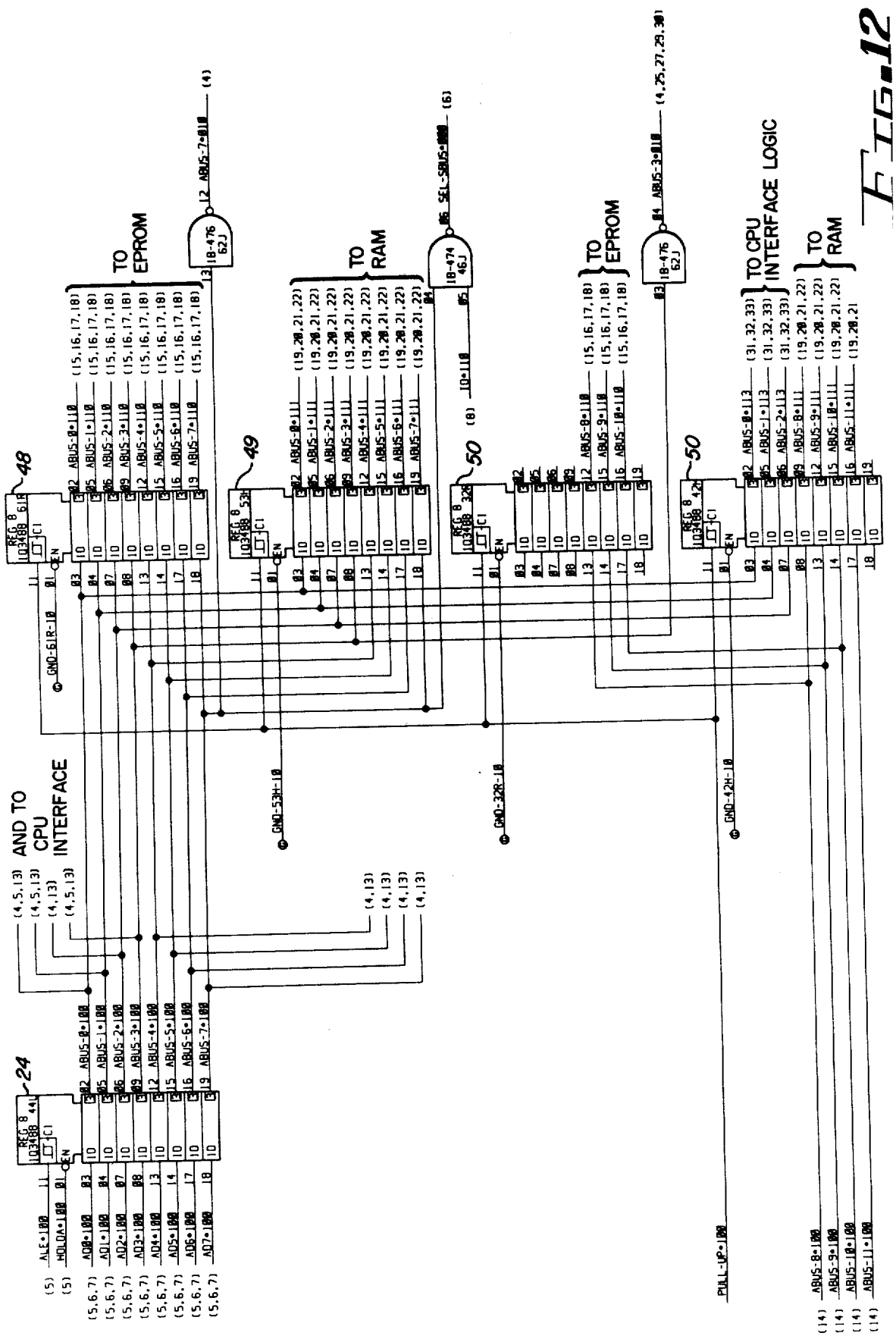

Address latch 24 is shown in more detail on FIG. 12. The purpose of this latch is to receive and hold the least significant half of the address for the current operation of the microprocessor when that portion of the address appears on address/data bus 12. In FIG. 12, the lines AD-0 through 7 constitute the inputs to the latch from address/data bus 12, and output lines ABUS-0 through 7 constitute the ABUS. The signal ALE serves as the latching signal; when it is high the outputs follow the inputs, and, when low, the outputs are latched. In the preferred embodiment, the address latch is a Texas Instruments SN74LS373.

Latch 48 in FIG. 12 consititutes the buffer driver between the address latch 24 and EPROM 23 in FIG. 1. Latch 49 is the buffer driver between the address latch and RAM 37 in FIG. 1, and latch 50 in FIG. 12 couples between lines A8 through 15 of address bus 22 via latch 35 in FIG. 14. This latch couples bits eight, nine and ten of the ABUS to EPROM 23, and supplies bits eight, nine, ten and eleven of the ABUS to RAM 37.

FIG. 4 shows more details of the circuitry comprising address decoder 27. The four one out of eight decoder chips on the left side of FIG. 4 decode bits zero through seven of the ABUS. The outputs from these decoder chips combine with the logic gates on the right side of FIG. 4 to generate various read, write and select signals for use elsewhere in the system and by the CPU interface logic. The uses of the signals and their generation should be obvious to those skilled in the art.

Further details on the board test port and circuitry for establishing system status is shown in FIG. 6. Hex buffer 51 serves as the input port for control signals from an external board tester unit. This unit simulates the signals RD, WR and IO normally presented by microprocessor 10 to the control bus for controlling the system. The signal MP-PRES is used to define the presence or absence of maintenance panel 14 from the system.

System status is continually checked by the firmware via hex buffer 52. As noted earlier, a digital computer programmed to perform a predetermined sequence of tests can be used to control the testing apparatus via the local or remote communication ports. The signal DPU-PRES indicates to the firmware that such a specially programmed data processing unit is present on the system. The signal T-PRES indicates to the firmware that the board test unit is present on the system.

The signals CDI-R and RNG-R indicate to the firmware that a remote terminal is requesting command of the system. The signal RNG-R becomes active when the remote terminal calls the testing apparatus via the remote USART 25 and the telephone system. The signal CDI-R stands for carrier detect indicator and indicates to the firmware that the modem coupling USART 25 to the phone lines has answered the phone and made the connection.

Figure 11:
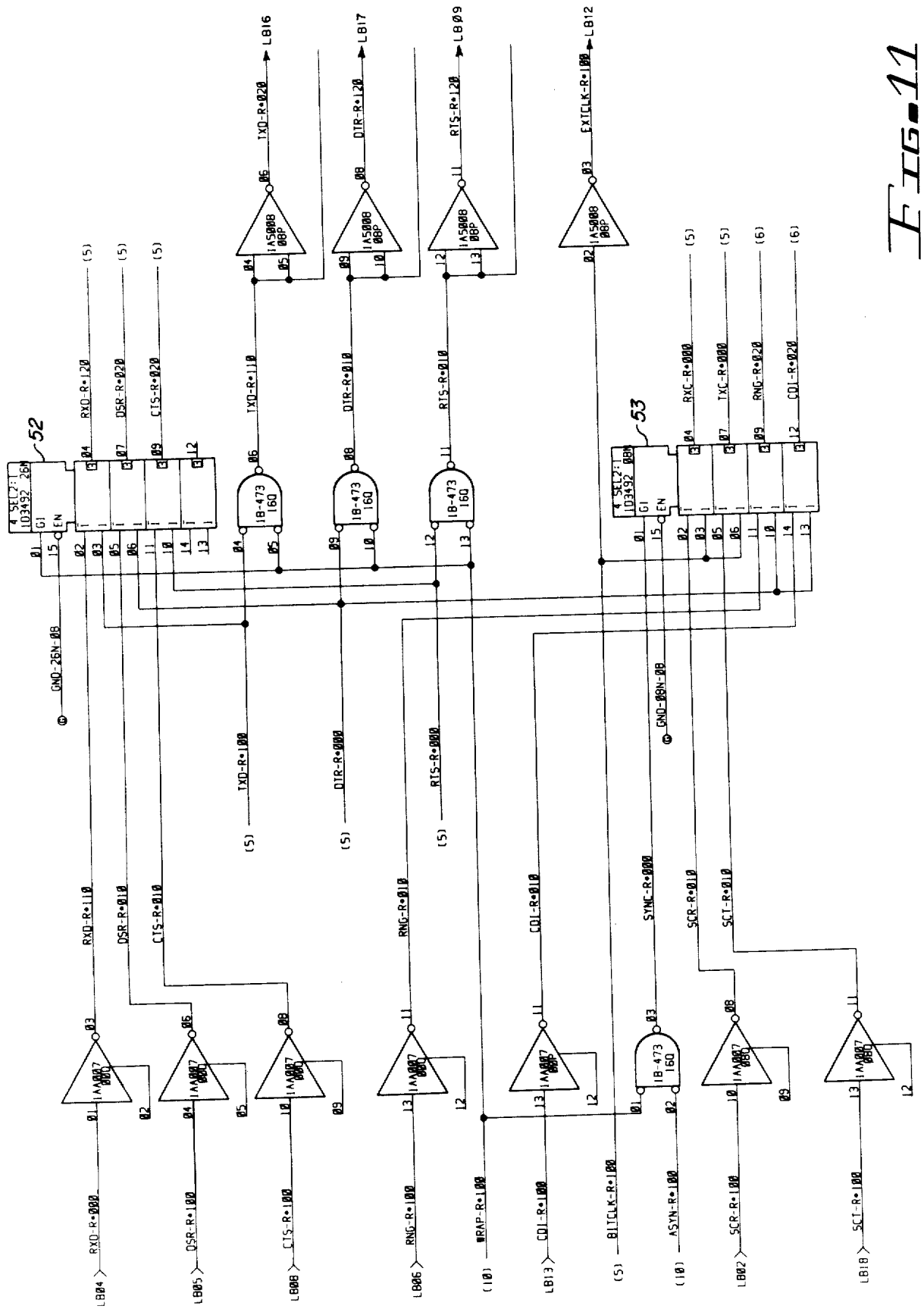

FIG. 11 shows more details of the modem control circuitry. Two-way dialog between the testing apparatus and the remote computer terminal is accomplished in the following fashion. When the testing apparatus desires to send data to the remote terminal for display, the signal RTS-R is sent. This signal is derived from the RTS output port of the remote USART 25 of FIG. 5. When the remote modem and terminal are ready to receive the transmitted data, the signal CTS-R-100 is sent to the testing apparatus via pin LB08. This signal is relayed to the remote USART via two line to one line data selector 52. This device selects a four bit word from one of two sources and routes it to the four outputs. The signal WRAP-R serves to control which of the two input words is selected. The purpose of this signal is to allow self test of the testing apparatus by providing for a wraparound capability such that the USART can send data to itself without the necessity of having a remote terminal connected.

Conversely, when the remote terminal or data processing system establishes a communications link with the testing apparatus, the microprocessor or signals that it is ready to receive data by causing the remote USART 25 to enable the DTR-R signal. The remote terminal responds that it is ready to trasmit by enabling the DSR-R signal. The data is then sent.

The actual data received by the USART comes in via the signal RXD-R from pin LB04 at the free edge. Likewise, the actual data transmitted to the remote terminal is carried by the signal TXD-R which leaves from free edge pin LB16.

Synchronous and asynchronous operation of the USART's requires a different clock arrangement than asynchronous. The signal BITCLK-R is used for asynchronous operation and is converted via two line to one line data selector 53 into the receiver clock signal RXC-R and the transmit clock signal TXC-R at the output of the data selector. These signals are used by remote USART 25 to control the rate of transmitting and receiving of data. In asynchronous operation, the same clock frequency is used for both trasmitting and receiving. However, during synchronous operation, a separate clock signal is used for transmitting and another clock signal for receiving. The receiving clock signal is SCR-R, and the transmitting clock signal is SCT-R. These two signals constitute the other two inputs to the first two data switches of data selector 53.

Because the EPROM can have a minimum access time of 450 nanoseconds, a wait cycle is needed during access of the PROM by microprocessor 10. This waiting time is provided by flip flops 53 and 54 in FIG. 8. The signal ALE-110 serves to clock flip flop 53 causing the signal MDLY to go high if the signal ENA-MDLY is high. ENA-MDLY will be high during a EPROM access. With the signal MDLY high, flip flop 54 will be clocked on the next clock pulse of the signal CLK-110 causing the output signal PROM-RDY to go low. This signal is combined in AND gate 55 on FIG. 9 with the signal STEP-RDY-100. If both of these inputs to AND gate 55 are high, the signal RDY-100 will also be high allowing the microprocessor to continue operation. However, when the signal RDY-100 goes low, the microprocessor will suspend operations and wait for a return by the signal to the high state. Thus, when flip flop 53 in FIG. 8 is set, the next clock pulse will set flip flop 54 and cause the signal RDY-100 to go low thereby putting the microprocessor in a wait state. The next clock pulse will then toggle flip flop 54 causing the signal RDY-100 to again go high and enable further operations by microprocessor 10 in FIG. 5.

Figure 9:
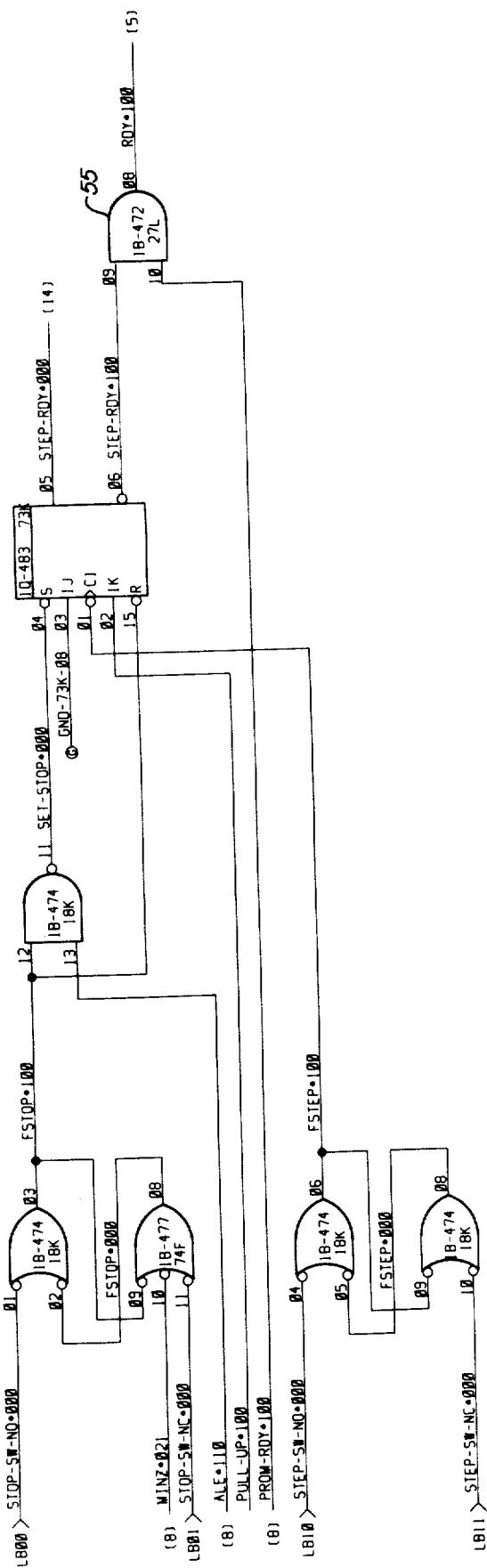

FIG. 9 shows the interface logic to a plugin board which is used to stop the microprocessor and allow it to be stepped through the microprocessor instructions. This board can be used for debugging the testing apparatus itself and should be self explanatory to those skilled in the art.

Figure 10:
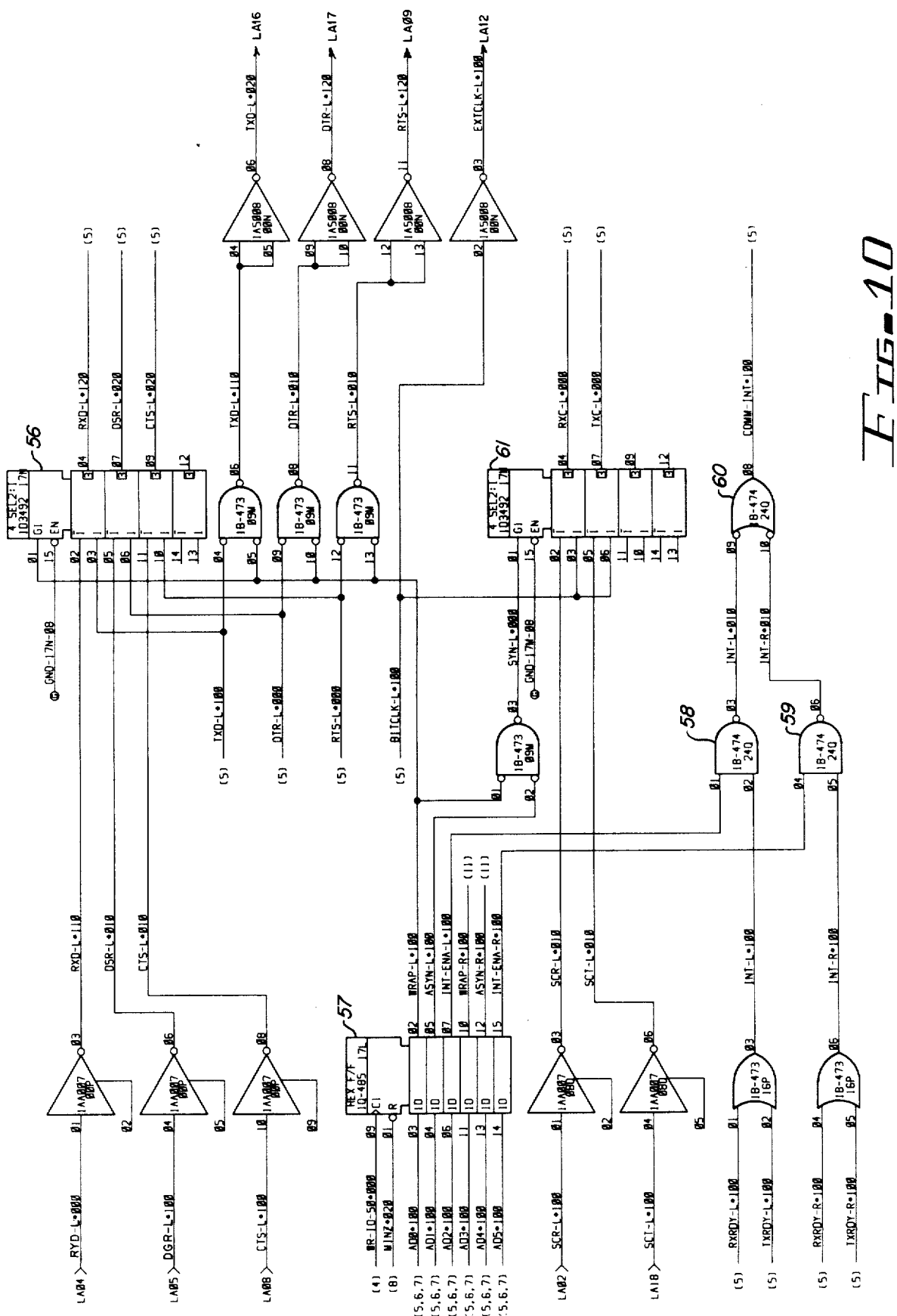

FIG. 10 shows the logic circuitry supporting the local communications interface USART 26 in FIGS. 1 and 5. The circuitry is very similar to that used for the remote communication USART 25. The local terminal sends data to the testing apparatus via the signal RXD-L, and it signals the testing apparatus when it is ready to transmit by sending the signal DSR-L. Similarly, the local terminal signals when it is ready to receive data by sending the signal CTS-L. These signals are relayed to the local USART by a two line to one line data selector 56. This data selector is used to provide for a wrap-around function under the command of the signal WRAP-L from hex buffer 57. The microprocessor controls this signal via the zero bit of address/data bus 12.

Bits two and five of the address/data bus enable interupts from the local or remote terminals via the signals INT-ENA-L and INT-ENA-R. These signals gate interrupt requests from the local and remote terminals to microprocessor 10 via gates 58 and 59 and signals INT-L and INT-R. These interrupt requests are generated when the local or remote USARTs signal they are ready to receive or transmit characters. The local and remote interrupt requests are ORed together to form one communications interrupt request COMM-INT via gate 60.

Of the remaining signals in FIG. 10 bits zero and three of the address/data bus 12 control wraparound mode for the local and remote USART's, and bits one and four control whether the local or remote USART's are operating in the asynchronous or synchronous mode. The signals SCR-L and SCT-L are the separate clock signals for synchronous transmitting and receiving by the local USART. They are presented as the first inputs to the first two switches of two line to one line data selector 61. When selected, they become the signals RXC-L and TXC-L. In asychronous mode, the signal BITCLK-L is switched through data selector 61 to become the signals RXC-L and TXC-L.

Finally, operation of the handshaking signals exchanged between the terminal and the local communications interface USART 26 is in all respects similar to the previous description for the remote interface.

It will be obvious to those skilled in the art that numerous variations in hardware and firmware could be made to the above described preferred embodiment. However, all such variations which perform the same function using similar apparatus and in a similar manner are intended to be included within the scope of the invention.

What is claimed is:

1. A programmable testing apparatus for performing selectable test which causes resulting events in a unit of the CPU of a data processing system, comprising:

a. a first means having a data bus port, an address bus input and a control port for non-volatile storage of a sequence of computer instructions specifically selected for the particular type of CPU to be tested, each said selected instruction being transferred via the data bus port into said first means at an address specified via the address bus input and thereafter said instructions being retrieved via the data bus port from the address specified by the address bus input;

b. a second means having a data bus port and a control port for interfacing with a control and display device via a communications network capable of carrying information over any distance, said control and display device for sending data, command and address information to said testing apparatus to select and control the test to be performed, and said display and control device for receiving and displaying information received by said testing apparatus from said CPU relating to the performance of said CPU, said second means for converting data arriving at said data bus port to a format suitable for use by said control and display device, and for converting information from said control and display device to a format suitable for use by said testing apparatus and for presenting said information at said data port and for generating an interrupt signal at a control port when data has been received from said control and display device; and, c. a third means having a data bus coupled to said data bus port of said first and second means for receiving instructions from said first means and data, address and command information from said second means, and having an address bus coupled to said address bus input of said first means for specifying the address from which an instruction is to be received, and having a control bus coupled to said control ports of said first and second means for selecting said first means when an instruction is to be fetched, and for receiving said interrupt signal from said second means, said interrupt signal causing said third means to fetch a particular sequence of instructions for reading that data, command and address information received from the control and display device, and for decoding the command information to determine what event in said CPU is to be caused by said testing apparatus, and for fetching and executing a series of instructions stored in said first means causing data to be sent to said CPU via said data bus for causing the desired event, and said third means for receiving, where appropriate, data from said CPU via said data bus relating to the performance of said CPU and indicating the correctness thereof, and for transmitting said data via said second means to the control and display device for display and evaluation.

2. A programmable testing apparatus as defined in claim 1 wherein said computer instructions are selected to cause a specific desired event for each specific command received via said second means in a non-CPU unit of a data processing system.

3. A programmable testing apparatus as defined in claims 1 or 2 further comprising a portable maintenance panel means for use in the immediate vicinity of unit under test, said maintenance panel means having a keyboard for entering data, command and address information for controlling the test performed by said testing apparatus, and having means for displaying said data relating to the performance by the tested unit, and having a data port for transmitting said data, command and address information to said third means and for receiving said data to be displayed therefrom, and having an address port for receiving address information from said third means for controlling display of said data, and said portable maintenance panel means for generating a an interrupt signal and having a control port coupled to said control bus for carrying said interrupt signal to said third means causing it to execute on interrupt routine of instructions in said first means to receive information from said portable maintenance panel means, said control port also for receiving control signals from said third means for enabling information transfers to and from said portable maintenance panel means.

4. A programmable testing apparatus for performing selectable test which cause resulting events in the CPU of a data processing system, comprising:
   a. a programmable read only memory having an address input and a data output and a control signal port for storing instructions comprising the program said testing apparatus follows in performing said selectable test on said CPU;
   b. a first USART having a parallel format data bus input, a serial format data port and a control signal port for converting data to be displayed regarding performance of the CPU from parallel to serial format and for transmitting it to a remotely located computer terminal via a pair of modems and a communications network and for receiving serial format data, commands and addresses from the remotely located computer terminal and for converting this information into parallel format for use by said testing apparatus in controlling the test to be performed;
   c. a second USART having a parallel format data bus input, a serial format data port and a control signal port for converting data to be displayed regarding the performance of the CPU from parallel to serial format and for transmitting it to a directly coupled local computer terminal, and for receiving data, commands and addresses from said local computer terminal in serial format and converting this information to parallel format for use by said testing apparatus in controlling the test to be performed;
   d. a programmable counter/timer having a data bus input, a control port, a baud clock input and three counter outputs, two of which are coupled to control inputs in said control ports of said first and second USART's for controlling the baud rate of exchange with said local and remote computer terminals in accord with control words received at said data bus input;
   e. a maintenance panel means having a keyboard for entering data, addresses and commands, a means for displaying data and a data bus port for receiving and transmitting data, an address port for receiving address information to control display by said maintenance panel;
   f. a random access memory for temporary storage of data during operations by said testing apparatus and having an address bus input, a control port, and a data bus port;
   g. a microprocessor having an address bus coupled to said random access memory and said programmable read only memory to supply address information to those devices when said microprocessor fetches information therefrom or writes data to said random access memory, said address bus also coupled to said maintenance panel for controlling the display functions thereof, and said microprocessor having a data bus coupled to said programmable read only memory for carrying instructions stored there at the address specified by said address bus to said microprocessor for execution, and said data bus coupled to said random access memory for carrying information to and from the addresses in said random access memory specified by said address bus, and said data bus coupled to said first and second USART's and said maintenance panel for carrying data, address and command information transmitted by said local and remote computer terminals and said maintenance panel to said microprocessor to control the test performed by said testing apparatus, and said data bus coupled to said CPU for carrying data to it for causing the desired event to occur, and for carrying data from said CPU relating to the performance thereof and indicating the correctness of performance of the CPU to said testing apparatus for display, said microprocessor having a control but coupled to said programmable read only memory, said first and second USART's, said random access memory, and said programmable counter/timer, for controlling these devices, said microprocessor for receiving data, commands and addresses indicating the desired test and for fetching and executing a series of instructions causing data to be sent to said CPU causing the desired event to occur therein and for receiving data from said CPU and causing the display thereof to indicate the performance of said CPU.

5. A programmable testing apparatus for performing selectable test which cause resulting events to occur in a unit of a computing system under test, comprising:
   a. a first means for storing information the testing apparatus uses in testing the unit;
   b. a second means for entering information to select the test performed by the testing apparatus on the unit and to display information from the resulting events; and,
   c. a computing means coupled to said first means for receiving information stored therein, and coupled to said second means for receiving information from said second means, and for performing a sequence of instructions stored in said first means for causing said computing means to perform the selectable test, said computing means also for sending out information to the unit for purposes of causing the events in the unit, and for receiving information resulting from the events in the unit indicating the correctness of performance by the unit, and for sending information to said second means for display.

6. A programmable testing apparatus for performing selectable test which cause resulting events in a unit of a computing system, comprising:
   a. a first means for storing information the testing apparatus uses in testing the unit;
   b. a second means for entering information to select the test performed by the testing apparatus on the unit, and to display information from the resulting events; and,
   c. a computing means coupled to said first means for receiving information stored therein, and coupled to said second means for receiving information from said second means, and for performing a sequence of instructions stored in said first means for causing said computing means to perform the selectable test, said computing means also for sending out information to the unit for purposes of causing the events in the unit, and for receiving information resulting from the events in the unit indicating the correctness of performance by the unit, and for sending information to said second means for display; and, d. a communication means coupled to said first means, said second means and said computing means for interfacing with a remote control and display means so that information may be sent from said remote control and display means to said computing means and the information resulting from the selectable test may be sent to said remote control and display means for display.

7. A programmable testing apparatus for performing selectable test which cause resulting events in a unit of a computer system, comprising:

a. a memory means for storing information;

b. a control means for entering information to control the selectable test performed by the testing apparatus on the unit and having a means for display of information from the resulting events and having an interface means for converting information entering and leaving said control means into the proper format for use by said control means and said memory means and the testing apparatus; and, c. a computing means coupled to said memory means for bidirectional flow of information between said memory means and said computing means and coupled to said control means for the bidirectional flow of information between said control means and said computing means, said computing means for receiving information from said control means indicating the desired test and for performing task as defined by information stored in said memory means causing information to be sent to and received from the unit and for receiving information from the unit related to its performance indicating the correctness of that performance and for transferring said information to said control means for display.

8. A programmable testing apparatus for performing selectable test which cause resulting events in a unit of a computer system, comprising:

a. a memory means for storing information;

b. a first control and display means for entering information to control the selectable test performed by the testing apparatus on the unit and having a means for display of information from the resulting events and having an interface means for converting information entering and leaving said control and display means into the proper format for use by said control and display means and said memory means and the computing means;

c. a second control and display means for entering information to select the test performed by the testing apparatus on the unit, and having a means to display information from the resulting events; and, d. a computing means coupled to said memory means and said first control and display means and said second control and display means, said computing means for receiving information from said first control and display means and said second control and display means to control the desired test to be performed by the testing apparatus by performing tasks as directed by information stored in said memory means which results in information being sent to said tested unit causing the resulting event within said said tested unit to occur, said computing means also for receiving information from said tested unit indicating the correctness of performance thereof and for sending said information to said first control and display means and to said second control and display means for display.

9. A programmable testing apparatus as defined in claims 7 or 8 wherein said interface means further comprises means for converting parallel format data to serial format for transmission of information from the testing apparatus, and for converting information received by said testing apparatus from serial to parallel format, for controlling the test to be performed.

10. A programmable testing apparatus as defined in claim 9, further comprising a remote control and display means coupled to the remote control and display interface means for entering information for controlling the test performed by the testing apparatus.

11. A programmable testing apparatus for performing selectable test which cause resulting events to occur in a computer system, from instructions from either a local or remote control and display means, comprising:

a. a memory means for storing information;

b. a local control and display and interface means coupled to said memory means and the computing means for interfacing between the testing apparatus and the local control and display means, said local control and display interface means for converting information from said local control and display means from a serial format to a parallel format and to signal when information has been received from the local control and display means, said local terminal interface also for converting from parallel format to serial format information being sent by said testing apparatus to said local control and display means for display and for signalling when a character is ready for transmission to the local control and display means;

c. a remote control and display interface means for interfacing with a control and display means located at a remote location from the computer system being tested for converting parallel format data received from the testing apparatus to serial format data for transmission to said remote control and display means, and for converting from serial format to parallel format data, information from said remote control and display means for control of the desired test performed by said testing apparatus; and, d. a computing means coupled to said memory means and coupled to said local and remote control and display interface means, said computing means for receiving information from a control and display means coupled to either the local control and display interface means or to the remote control and display interface means and for performing tasks as directed by information stored in said memory means for causing predetermined information to be sent to said computing means causing the resulting events therein, and for receiving information from said computing means relating to the performance thereof indicating the correctness of that performance and for sending said information to said control and display means for display.

12. A programmable testing apparatus as defined in claim 11 further comprising a remote control and display means coupled to the remote control and display interface means for entering information for controlling the test performed by the testing apparatus.

* * * * *